(12) United States Patent
Kawasaki et al.

(10) Patent No.: US 9,276,418 B2
(45) Date of Patent: Mar. 1, 2016

(54) BATTERY EXCHANGE, RECHARGE AND RECYCLE APPARATUS, SYSTEM AND METHOD

(75) Inventors: Charles N. Kawasaki, Portland, OR (US); Mark P. Wilson, Santa Clarita, CA (US)

(73) Assignee: Green Box Batteries, LLC., Lakewood, WA (US)

( * ) Notice: Subject to any disclaimer, the term of this patent is extended or adjusted under 35 U.S.C. 154(b) by 428 days.

(21) Appl. No.: 13/609,147

(22) Filed: Sep. 10, 2012

(65) Prior Publication Data

US 2013/0063073 A1 Mar. 14, 2013

Related U.S. Application Data

(60) Provisional application No. 61/533,023, filed on Sep. 9, 2011.

(51) Int. Cl.
*H02J 7/00* (2006.01)
*H02J 7/35* (2006.01)
*H02J 9/06* (2006.01)

(52) U.S. Cl.
CPC ............. *H02J 7/0027* (2013.01); *H02J 7/0045* (2013.01); *H02J 7/35* (2013.01); *H02J 9/06* (2013.01)

(58) Field of Classification Search
USPC .......................................................... 320/113
See application file for complete search history.

(56) References Cited

U.S. PATENT DOCUMENTS

| 2011/0074350 A1* | 3/2011 | Kocher ......................... 320/109 |
| 2012/0074901 A1* | 3/2012 | Mohammed ................... 320/109 |

\* cited by examiner

*Primary Examiner* — Suresh Memula
(74) *Attorney, Agent, or Firm* — Green Box Batteries, LLC.; Shem I. Zakem

(57) ABSTRACT

A battery cartridge and kiosk apparatus, system and method, which enables consumers to conveniently exchange depleted rechargeable batteries for fully-charged batteries, and to recycle used primary batteries. The system includes a self-contained, typically automated kiosk designed for high volume battery exchange at low cost, and also includes re-usable battery trays for convenient, safe, and standardized handling and transport of rechargeable consumer batteries. A kiosk of the invented system may also be configured to utilize renewable-energy mechanisms to provide power for operation and/or recharging. Rechargeable batteries are stored and managed in a high-density, simple yet reliable storage rack wherein they are recharged in parallel while preserving long battery life. Batteries may be "keyed" to prevent recharging via third-party charging devices, enabling operating efficiencies and cost reductions.

30 Claims, 20 Drawing Sheets

BATTERY EXCHANGE, RECHARGE AND RECYCLE APPARATUS, SYSTEM AND METHOD

RELATED APPLICATIONS

This application claims the benefit of priority to U.S. Provisional application No. 61/533,023, filed on Sep. 9, 2011 and entitled NETWORKED SECONDARY-BATTERY EXCHANGE/RECYCLE KIOSK, the contents of which are hereby incorporated herein in their entirety by this reference.

FIELD OF THE INVENTION

The invention relates to the field of internet-enabled retail kiosks, and more particularly to aspects of an apparatus, system and method for providing re-chargeable, re-usable ("Secondary") consumer batteries, and for depositing one-time use ("Primary") batteries and Secondary batteries for recycling.

BACKGROUND OF THE INVENTION

The U.S. Environmental Protection Agency estimates that consumers in the United States purchase three (3) billion Primary batteries per year. Today, an estimated 80%-90% of these batteries end up discarded in landfills. The website ESHO.com reports that in 1989, over 600 tons of consumer dry-cell batteries were discarded into landfills. These batteries contain zinc, lead, nickel, alkalines, manganese, cadmium, silver, and mercury—heavy metals and other materials which can pose environmental and health hazards. One key reason these batteries are discarded into the standard consumer waste-stream is because of a lack of widely distributed, convenient recycle drop-off stations and the lack of municipal "curbside" recycling support for batteries. Consumers generally do not know where to recycle batteries, or are required to make special "out of the way" trips to central recycling centers—an inconvenient process that faces strong customer resistance.

Today, the standard consumer "retail-available" Primary batteries (e.g., including form factors such as AAA, AA, C, D and 9-volt, etc.) use alkaline chemistry, (http://en.wikipedia.org/wiki/Alkaline_battery). Because these types of batteries are mass produced and the product of continued improvements, consumers have grown to expect a high level of performance, in particular, high energy density (battery capacity). In addition, the batteries are inexpensive, convenient (fully charged when purchased), and readily available world-wide. However, as noted above, single-use are environmentally damaging, and as compared to Secondary batteries, are much more expensive over a typical lifetime of battery use.

Historically, consumer experience with and perception of Secondary batteries has largely been poor. The most common Secondary battery type until recently has been Nickel-cadmium ("NiCad") batteries, (http://en.wikipedia.org/wiki/Nickel-cadmium_battery). These batteries, produced in volumes as high as 1.5 Billion units per year, suffer from numerous major problems—limited energy density, expense, overly-fast self-discharge rate, and "memory." While these batteries have been extensively "embedded" in consumer devices, they are losing ground significantly to new technologies due to such problems. Likewise, consumers have largely abandoned using NiCad batteries as direct replacements for "retail-available" Primary batteries such as AAA, A, C, D and 9-volt batteries. Today, consumers maintain a very poor opinion of Secondary batteries. Manufacturers have all but stopped offering them in retail outlets due to poor consumer acceptance, so consumers have had few convenient options to purchase Secondary batteries.

However, in 2005, Sanyo Corp of Japan introduced consumer/retail oriented Secondary batteries based on new "Low Self Discharge" Nickel-metal Hydride ("NiMH") battery technology (http://en.wikipedia.org/wiki/Nickel-metal_hydride___battery). The capacity, price and usability of this new type of Secondary battery has improved to the point that they are usable and acceptable as a replacement for Primary batteries in the "retail" application, and in some ways outperform Primary batteries. In addition to having similar energy density to alkaline batteries, the new NiMH batteries maintain their charge well on-the-shelf (enabling them to be pre-charged at the factory) and they do not have the "memory" effects that plagued NiCad batteries. These properties solve two of the key problems associated in consumer's minds with Secondary batteries. Additionally, NiMH batteries have somewhat less environmental impact than NiCad or other battery types that contain Cadmium.

However, these new NiMH batteries still have several key problems when compared to retail alkaline Primary batteries. Firstly, they cost more than alkaline batteries on an up-front basis. While the are tens or hundreds of times less expensive over the long-term, because they can be recharged up to 1,500 times, the up-front cost to the consumer for each battery is currently two or three times (or more) higher than that of standard alkaline batteries. In addition, consumers must buy recharging systems to take advantage of the rechargeable nature of the batteries, which imposes an additional up-front cost.

In addition, Secondary batteries require consumers to remove discharged batteries from their appliances/toys, place them into the recharging station, and wait several hours for full recharge cycles. Consumers must create a small battery charging area in their houses, and must buy additional "backup" batteries to have on hand if they want continuous usage of their battery-powered appliances.

U.S. Pat. Nos. 5,544,784, 5,694,019, 6,154,006 and 5,618,644 describe existing battery recharging kiosks and/or recharging circuitry. However, in our opinion, these existing concepts do not provide ease-of-use, mechanical reliability, capacity, safety, tracking and protection mechanisms sufficient to create a viable, reliable, cost-effective solution that meets the needs of consumers. In particular, existing kiosk patents and designs suffer from a number of problems, making them unsuitable to meet consumer needs and not economically viable. As a result, no company has built or deployed such kiosks on a broad scale.

One key problem that must be solved is the lack of capacity in existing kiosks. Kiosks must be able to dispense, recharge, and house a large number of batteries in a small space—to reduce personnel servicing costs and to adequately serve high-volume retails outlets (e.g., Walmart, Costco, etc.). Some current designs using linear storage arrays suffer from mechanical complexity and poor utilization of space. Other designs using gravity-fed or stacking mechanisms have insufficient ability to charge enough batteries quickly enough to consistently serve large volumes of customers—making the systems economically non-viable.

Another key problem is that previous, existing kiosk designs include intake and dispensing of batteries "one at a time." Not only does this approach lengthen the throughput time for a transaction, but it also requires the mechanisms inside a kiosk to directly and individually handle, identify and properly disposition multiple battery form-factors. This in turn requires generically-configured transport mechanisms and/or grasping mechanisms that are unreliable and prone to failure and jamming, and that are too slow in operation to service large numbers of customers.

Another key problem is that household batteries in the AA, AAA, C, D and 9-volt form factors are standardized, and as such, customers of vending machines can easily purchase the batteries and then recharge them at home, using home rechargers. Without a device to prohibit such home recharging, or to make use of a kiosk more advantageous to consumers than is home recharging, kiosk makers cannot recoup the investment in the engineering and manufacturing of automated recharging kiosks. As yet, no kiosks having such advantageous characteristics have been reduced to practice and/or built.

Additionally, due to design limitations, numerous prior art battery charging systems require fast-charging of batteries— dramatically reducing battery life.

Still another deficiency observed in the prior art systems is the ability to place battery recharging kiosks in locations having no access, or unreliable/inconsistent access to public utility power, or where such access is present but the cost of which is prohibitively high. These conditions may restrict the locations where kiosks may be placed to only areas with convenient, reliable, and affordable AC/utility power, and/or alternatively may require previous designs to contain an expensive, heavy, maintenance-prone backup and storage battery.

BRIEF DESCRIPTION OF THE DRAWINGS

FIG. 4f depicts an end elevation view of the battery tray of FIG. 4a.

DETAILED DESCRIPTION OF THE PREFERRED EMBODIMENTS

Figure 1:
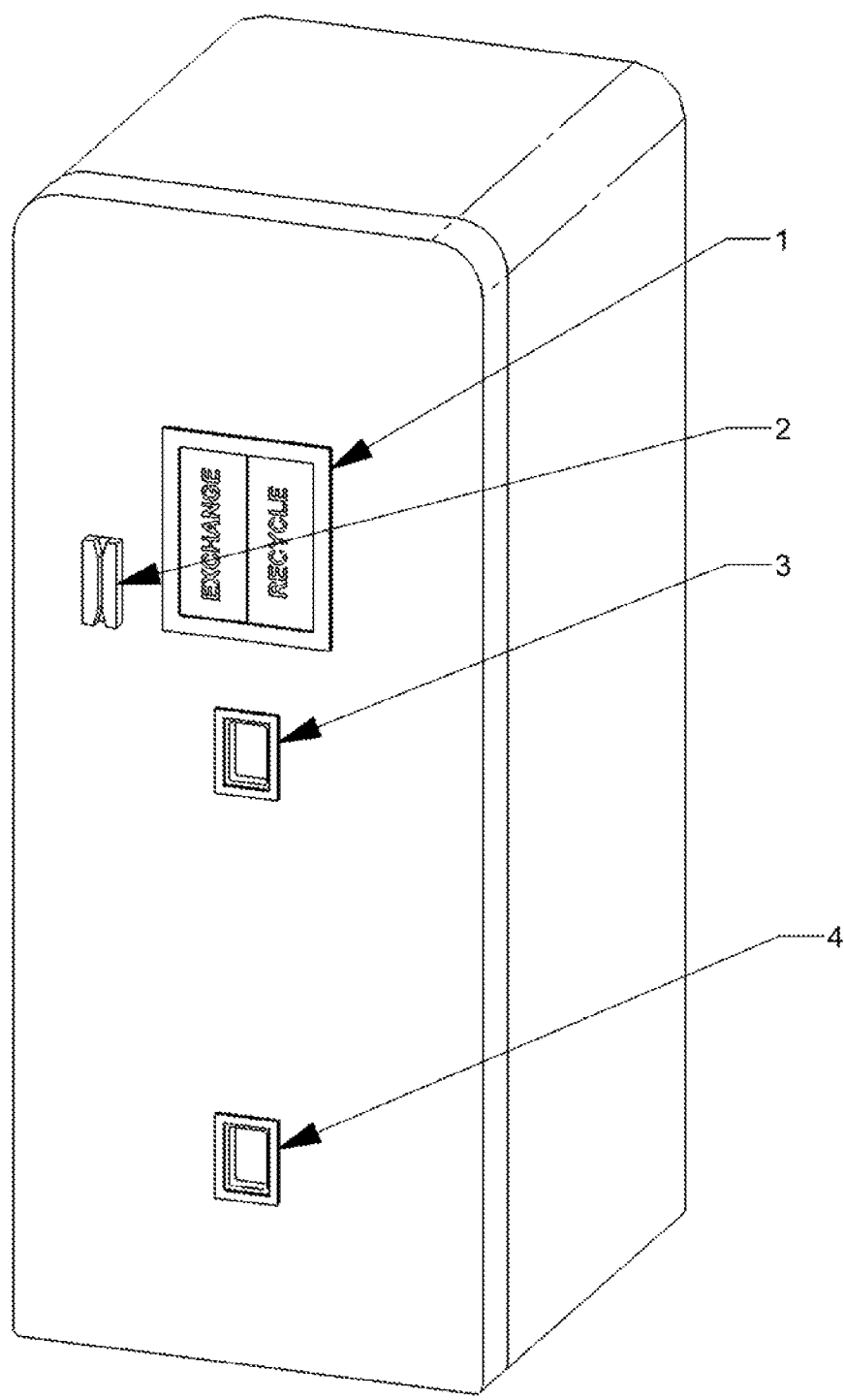
FIG. 1 depicts an isometric frontal view of a kiosk, according to an embodiment of the invention.

The invention includes but is not limited to battery sales, rental/exchange, re-charge and recycle kiosks, which can be located indoors or outdoors at convenient locations (e.g., grocery stores, convenience stores, fast food restaurants, gas stations, etc.). In an embodiment, each kiosk is managed by one or more computerized control systems that may be connected to the Internet and/or a private network, via either or both of wired and wireless connections, to facilitate and complete financial transactions and/or conduct account and maintenance activities, with or without the use of an on-site attendant.

The described embodiments enable exchange of pre-charged Secondary batteries in typical retail form factors ("sizes") including but not limited to AAA, AA, C, D and 9-volt, also referred to herein as "consumer batteries." Via in-kiosk recharging of discharged (used) Secondary batteries, consumers may return Secondary batteries which they have used, and they may immediately receive fully-charged replacement batteries without waiting during all or some portion of a recharge cycle. For example, a kiosk will typically be configured to retain a substantial inventory of pre-charged, recharged batteries.

Embodiments of the invention also provide for easy recycling of discharged Primary and/or "spent" Secondary batteries. Consumers can deposit old, dead batteries for either or both of a small fee and a deposit refund. Therefore, dead batteries can easily be collected and delivered to recycle centers.

According to at least one embodiment, a kiosk includes and/or is coupled with suitably configured components to enable recharging of batteries using solar power or other renewable energy sources (as well as standard public utility AC power). Additionally and/or alternatively, a kiosk can optionally use its own inventory of batteries as a backup power supply, to provide power to its own computer and control mechanisms during power outages or periods of low sunlight for example. The contemplated embodiments enable a kiosk system so configured to be placed in nearly any location and to operate substantially, or even entirely, autonomously (e.g., using its own power sources).

In an embodiment, a kiosk intakes and dispenses batteries housed in convenient "cartridges" or "trays," which terms shall be used and interpreted interchangeably throughout this description. Such trays typically possess standardized (e.g., uniform) dimensions, external features, and/or configurations in at least one embodiment, enabling universal and reliable handling means, interchangeability, storage flexibility, and material cost savings, as well as providing convenient, reusable battery packaging for consumers. Additionally, an embodiment of a kiosk contains multiple battery chargers each operatively coupled within a high-density storage rack, enabling the kiosk to service large numbers of customers each day. Further still, an embodiment of an invented kiosk uses batteries having unique identification features and/or keying mechanisms, which individually or in combination can prevent the batteries from being recharged by means other than the kiosk. One benefit of such features is to enable novel discount pricing plans, although other benefits will also become apparent to an ordinarily skilled artisan in light of this description.

It is contemplated that implementation of embodiments of the invention will encourage the adoption of re-chargeable batteries by consumers as a viable replacement for onetime use ("Primary" or "disposable") batteries. For example, the inventive embodiments make the overall consumer cost of re-chargeable batteries less expensive than one-time use batteries, while at the same time making re-chargeable batteries just as convenient to use as one-time use batteries. Additionally, embodiments of the invention further relate to Internet-enabled business models, allowing for additional services and convenience features for consumers.

Turning now to the drawing figures, FIG. 1 shows an embodiment of a kiosk including an enclosure (e.g., housing) designed for indoor or outdoor use, providing protection from weather. Additionally, the enclosure may be configured with features and/or materials rendering it sufficiently durable to withstand reasonably expected instances of vandalism (e.g., kicking, hitting, scratching, etc.). Examples of enclosures suitable for both purposes may be constructed of materials such as steel, aluminum, polycarbonate and/or other such durable, impact-resistant, water-resistant ultraviolet exposure-resistant material. Likewise, a weather-resistant enclosure may include overlapping members at seams, resilient seals disposed at joints, rain-channeling structures, and/or other structures configured to prevent reasonably expected environmental conditions from affecting the reliable operation of a kiosk, as may be recognized by an ordinarily skilled artisan.

The depicted kiosk includes a touch-screen or other computer-controlled display 1 enabling consumers to read instructions and conduct transactions, such as renting/purchasing new batteries, returning spent batteries, exchanging batteries and/or recycling old batteries.

A credit/debit/stored-value card reader 2 is preferably but not necessarily included in a typical embodiment, and is useful for obtaining payment from consumers. Alternatively a card reader may simply read a card to identify the consumer from a local or remote database. Other embodiments additionally or alternatively include coin/cash intake and/or dispensing mechanisms, and/or printers for receipts, coupons, credits, etc.

A battery 'intake mechanism' or 'intake port' 3, which terms shall be used and interpreted interchangeably throughout this description, may include a closure (e.g., a 'door') and may be either motorized or manually operated. The intake mechanism receives from consumers batteries in uniform trays, and transports them into the interior of the kiosk. In embodiments, the intake mechanism is used for both battery intake and battery dispensing, as in the case of the kiosk depicted in FIGS. 12-14. The intake mechanism is configured, in an embodiment, with reading means (not shown in FIG. 1) suitably configured to read information encoded at a portion of the battery via a coding means that would be recognizable to an ordinarily skilled artisan, including but not limited to a bar code, RFID circuitry, printed text, and/or another machine-readable format. Numerous bar code readers, RFID readers, and text readers (e.g., optical character recognition, or "OCR") are known in the art, any of which may be employed within the scope of the inventive embodiments.

The encoded information can include identifiers of a battery size, manufacturer, type and/or other useful information, and may also include an identification code specific to each individual battery, a number of recharge cycles, etc. An intake mechanism may also be suitably configured to transmit the information to the control system, and to deliver batteries to a storage/charging system. Once the battery information is read by the reading means, it is transmitted to the control unit 14 for subsequent control functions.

Figure 2:
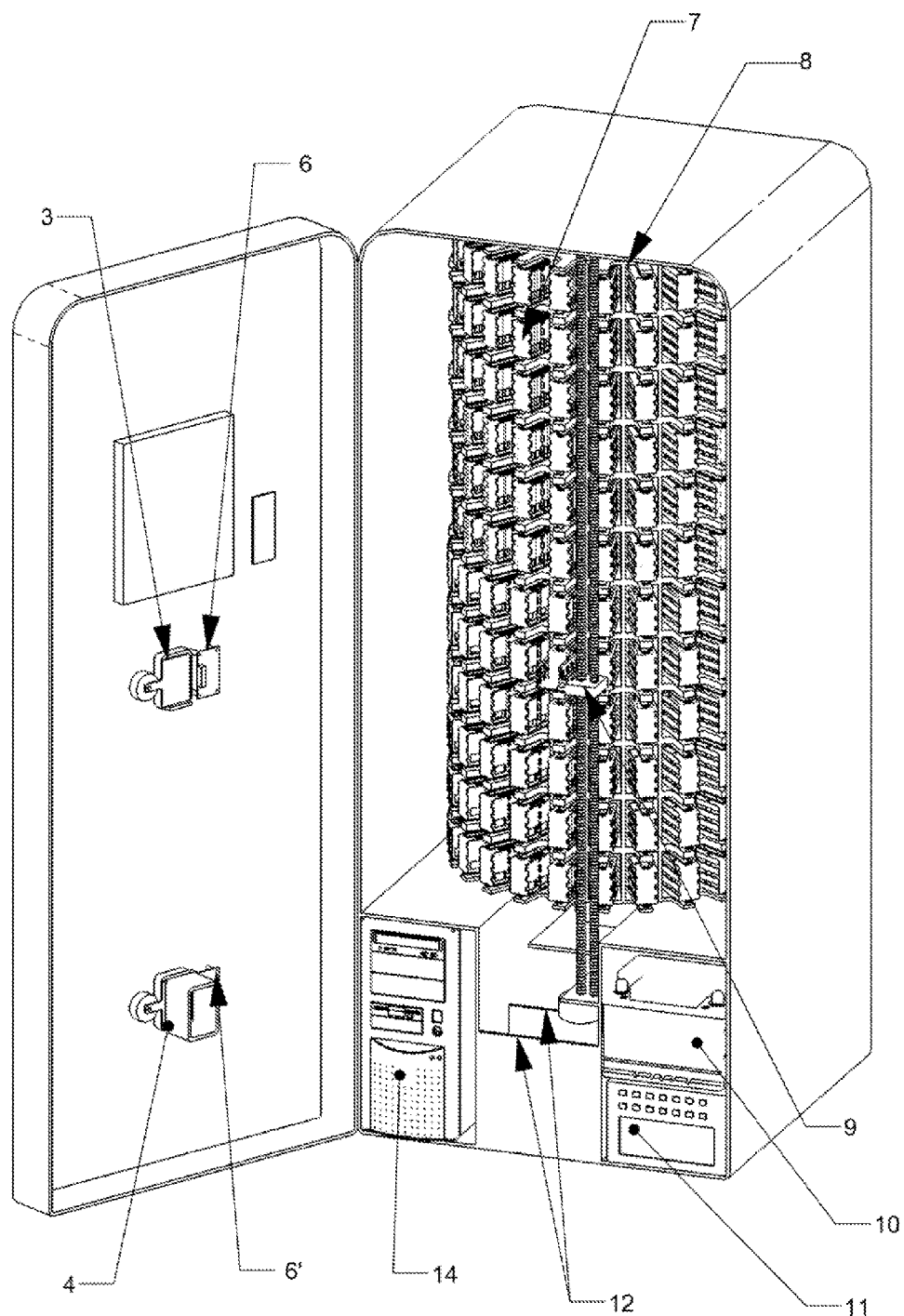
FIG. 2 depicts an isometric frontal view of internal features of a kiosk, according to an embodiment of the invention.

At least the exemplary kiosk embodiment depicted in FIGS. 2-3 further includes a separate battery-dispensing mechanism (e.g., port, etc.) 4, capable of dispensing batteries in trays to customers. The dispensing mechanism may also include a door or other closure mechanism, and may be configured for either of motorized or manual operation as described above with regard to the intake receptacle. Additionally, as described relative to the intake mechanism 3, the dispensing mechanism 4 may in an embodiment likewise include a reading means 6' suitably disposed and configured to read information coded at either or both of a battery tray and/or a battery coupled therewith. Useful benefits of a reading means so configured include confirming that a battery type/size being dispensed matches the user's request, for example, although an ordinarily skilled artisan will recognize other benefits not specifically listed herein.

FIG. 2 shows an embodiment of the internal structure of the invention, with major functional components including a rotating storage/charging rack 8, a tray storage/retrieval transport mechanism mounted on a vertical rail 9, bins for recycled batteries 12, internal reading means 6 and 6' for scanning and/or reading coding means of batteries, and inner portions of each of the intake mechanism 3 and dispensing mechanism 4. Depicted computer and electrical components include a system control unit 14, an optional on-board backup battery 10, rotating recharging/discharging circuitry disposed at the top of the rotating storage/charging rack 8, and an input power control unit 11 and power coupling.

The control unit 14 is depicted in FIG. 2 as a tower-style personal computer ("PC"), but may be implemented in any computation form-factor commonly known to those skilled in the art. The control unit may be configured with suitable circuitry, components, (e.g., processors, memory devices, communication buses, etc.), coded instructions, and other features to perform all or any subset of control functions for operating the kiosk. However, alternatively, such features and/or capabilities may be segregated into multiple independent programs, or distributed across multiple processors, or otherwise alternatively configured to provide benefits such as improved processing speed, decreased space consumption within a kiosk, thermal management, system redundancy for robustness against failure, or other such beneficial properties.

Control functions provided by a control unit, in one or more of the contemplated embodiments, include but are not limited to presentation and management of the user interface, conducting financial transactions, managing battery inventory, managing power systems, managing battery recharge timing, and communicating to a central (e.g., remotely located, network-linked) computing system for maintenance, inventory and tracking. The control unit may use any known means to communicate with a central computing system including but not limited to communication means configured for wired internet communication, wireless communication, cellular communication, a public switched telephone network (PSTN), etc. For example, the exemplary kiosk devices depicted in FIGS. 12-13 each include an antenna 1205 enabling either or both of transmitting wireless signals to and receiving wireless signals from a remotely located communications center, whether mobile or stationary. For example, an attendant can remotely interrogate a status of one or more kiosk devices, and can then efficiently plan a route for attending to only those kiosk devices that need local intervention (e.g., to replenish supplies, to repair defects or damage, to perform scheduled maintenance, etc.).

Additionally and/or alternatively, the control unit may include local data storage means enabling full "off line" functionality when the kiosk cannot, or may be programmed to not, communicate with the central computing system. It may also have local maintenance input/output ports and peripherals. Not shown, but well known to those skilled in the art, an embodiment of the invention includes an optional printer for printing receipts, coupons, etc.—facilitating any number of related business models and financial transactions.

The depicted typical but non-exclusive embodiment includes the high-density, computer-controlled battery storage/charging rack 8, having capacity for several thousand batteries retained in substantially uniform trays arrayed throughout a rotating drum mechanism. By "substantially uniform," it is typically meant that such trays have one or more uniform features and/or structural configurations that enable correspondingly uniform kiosk structures and/or mechanisms for handling, storing, etc., even while the trays themselves may be simultaneously configured to retain different types of batteries.

The depicted rack configuration maximizes an overall battery capacity of a kiosk while minimizing the number of mechanical moving parts. The rotating rack provides for one or more battery storage locations each of which is operatively coupled to discharging/recharging circuitry that is also typically coupled with the rack. By such arrangement, a plurality of batteries may be tested or charged simultaneously, facilitating the availability of freshly recharged batteries even when the kiosk operates in a high-volume location. Further because multiple batteries may be recharged in parallel, battery recharging may be conducted at a rate that maximizes battery life, thus providing an advantage over numerous battery charging systems known in the art.

One embodiment includes one or more storage bins 12 to retain deposited batteries until they are collected by service personnel for subsequent recycling, for example. In an embodiment, the battery intake mechanisms provide an additional intake/transport receptacle at which batteries to be recycled can be scanned (e.g., using techniques such as but not limited to Bar Code, RFID, or OCR). A battery transport mechanism then delivers the batteries to a corresponding storage receptacle (e.g., bin). Multiple such receptacles may be provided in an embodiment, and the kiosk can be configured to sort the batteries by type different battery chemistry: NiCad, NiMH, alkaline, etc.). Such "pre-sorting" beneficially avoids the substantial cost of sorting for downstream recycling entities, which savings to the overall battery recycling ecosystem enhances the value provided by the invented embodiments.

An exemplary embodiment further includes one or both of a power control system 11 and an optional on-board backup battery 10. An exemplary but non-exclusive power control system is configured to provide computer control over the input power to the kiosk. Input power sources include one or more sources of any voltage or power type, and include but are not limited to solar panels, public utility AC, or other power sources. The input power to the invention is used to power any of or all systems of the kiosk, according to alternative control schema, including the internal control systems, user displays, communications systems, drive motors of moving components, battery charging circuitry, etc. The power control system may be programmed to prefer certain input sources such as the solar array when solar power is available, and may also switch power sources based on a predetermined schedule (e.g., pre-programmed via coded instructions stored at a memory means of the kiosk and/or communicated to the kiosk from a central control computer. A preferred but non-exclusive embodiment uses input power to charge the inventory of batteries in the storage rack 8 and/or to charge an intermediate storage battery 10 (e.g., to store excess solar power in the event that the inventory of uncharged batteries is insufficient to store all available solar power).

Figure 3A:
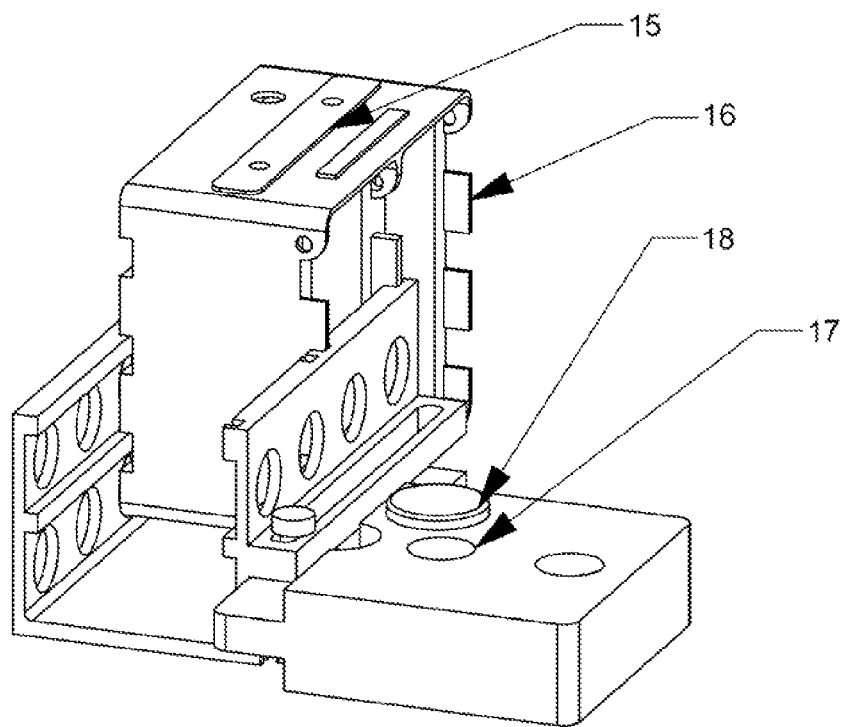
FIGS. 3a and 3b depict respective isometric top and bottom views of a storage/retrieval mechanism used to retrieve/store a battery tray to/from battery intake and/or dispensing mechanisms, a rotating storage/charge unit, and/or a recycle bin, according to an embodiment of the invention.
Figure 3B:
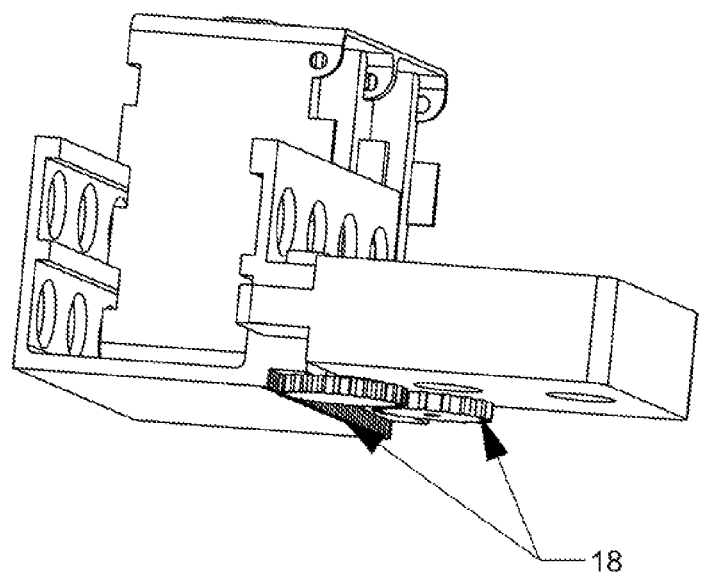

FIGS. 3*a* and 3*b* depict in detail structural features of an embodiment of the transport mechanism 9 configured to operably interact with a battery tray 16. The transport mechanism is used for one or more of intake, transport, moving to storage, and dispensing of battery trays, for example, preferably using a battery tray 16 configured with a standard (e.g., uniform, universal, etc.) external form-factor. In an embodiment, the transport mechanism is able to intake/dispense a tray along keyed rails that match corresponding structural features disposed at the exterior of the tray as shown. The transport mechanism typically uses motors and gears 18, for example, to transport the tray horizontally, with one end of the travel typically being at either or both of the intake and dispensing mechanisms, and another end of travel typically being at a battery storage/recharging receptacle of the storage/charging rack. Using one or more revolving, vertically arranged rods (as shown in FIG. 2) threaded through one or more corresponding holes 17 in the mechanism, the entire mechanism may be moved vertically along a length of the storage/charging rack, enabling storage/retrieval of trays at different rows of the rack.

FIGS. 4*a*-4*e* and 18-21 depict embodiments of battery 'cartridges,' or 'trays,' configured to contain one or more secondary batteries, in various form-factors each having standardized external dimensions but having inner dimensions and/or features specific to a particular battery type/size. One or more batteries of a specific standard size can fit inside each of the corresponding specifically-configured trays. Each tray is preferably constructed such that consumers must insert each battery in a correct, predetermined orientation, although proper battery orientation can alternatively be facilitated by providing instructions, diagrams, or other visual guidance on the tray itself and/or via a display device of a kiosk, for example. For example, a predetermined orientation may require that the positive terminal of a AA battery is oriented toward a particular sidewall of the tray. A predetermined orientation may be the same for each of the several batteries in a tray, or may be different for at least one battery relative to at least another of the batteries. Nevertheless, any battery placed in a particular position in the tray will normally be oriented according to the predetermined orientation for that battery position. As used herein, a 'terminal' of a battery refers to a positive electrode (anode) or negative electrode (cathode) of a battery.

Figure 4A:
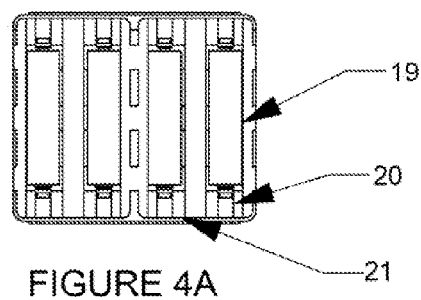
FIGS. 4a-4e depict corresponding side elevation views of live battery trays each having coupled therewith one or more batteries of a respective common household battery form factor, according to alternative embodiments of the invention.
Figure 4B:
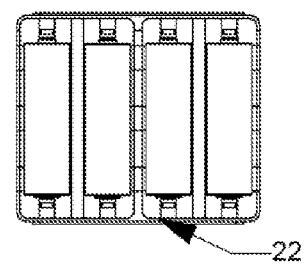
Figure 4C:
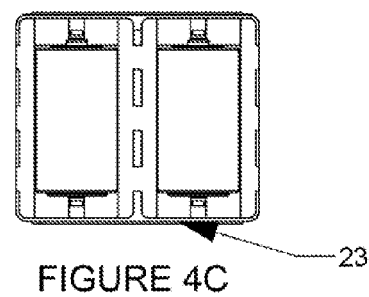
Figure 4D:
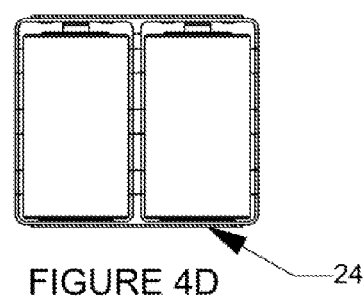
Figure 4F:
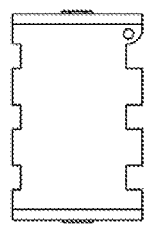
Figure 4E:
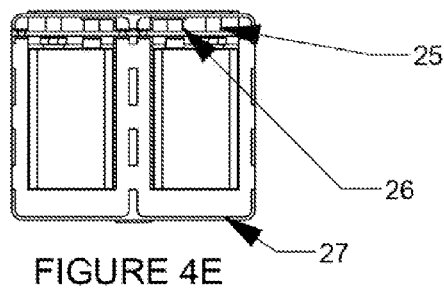

As an exemplary embodiment, FIG. 4a depicts a tray 21 configured to retain plural standard AAA-type batteries 19 inserted such that each battery snaps into the tray and connects with one or more spring-loaded power contacts 20. Internal features of each tray type, such as spring contacts, the dimensions and/or configuration of a closure device (e.g., door) and the internal dimensions and shape of each tray, provide for reliable physical and electrical contact with a specified battery form factor. FIGS. 4b-4e depict battery trays 22, 23, 24 and 27 alternatively configured corresponding to standard AA, C, D and 9-volt battery configurations, respectively. In particular, FIG. 4e depicts an embodiment of dual contacts 25 and 26 disposed at the interior of a battery tray to provide reliable electrical connections for 9-volt batteries. FIG. 4f depicts an end view of the battery tray of FIG. 4a in particular, but will be understood by an ordinarily skilled artisan to also substantially correspond to the exemplary battery trays of FIGS. 4b-4e.

In a preferred but not exclusive embodiment, the battery trays are dispensed to consumers and serve as reusable battery packaging providing convenient transport and management for consumers, protecting batteries during handling, providing a substrate for instructional markings, advertising, and other information, and providing other benefits. The trays solve the additional safety concern of loose batteries during transport inherent in some prior art designs, which can potentially contact one another creating a short-circuit and possible fire hazard.

Figure 5:
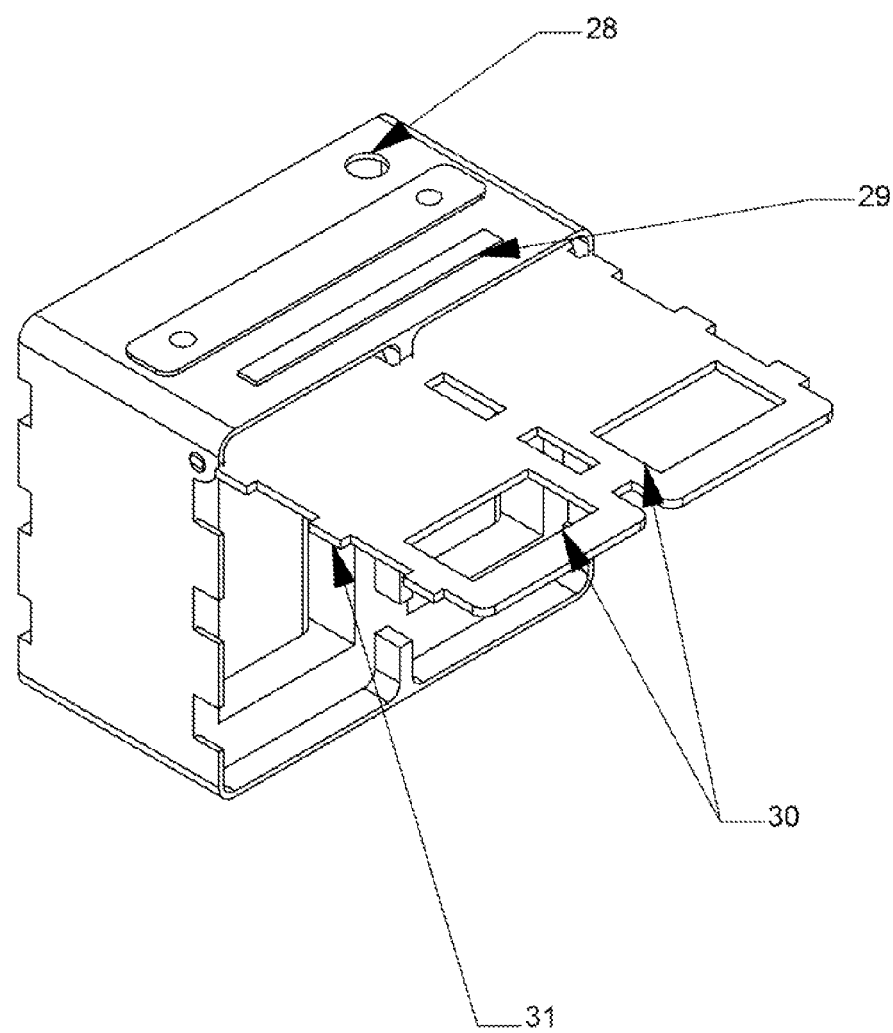
FIG. 5 depicts an isometric side-view of a battery tray, according to an embodiment of the invention.

FIG. 5 provides a detailed view of an exemplary D cell battery tray embodiment, showing a keying hole 28 which provides access for a simple mechanical sensing means of the kiosk to determine the tray type (AA, AAA, C, D, etc.), where the hole is located in a different location for trays configured for each battery type relative to those configured for other battery types. Other means usable to identify the tray type include (but are not limited to) optical sensors, bar code readers, etc., well known to those skilled in the art.

Each tray may include one set of corresponding positive and negative contacts 15 for each battery in the tray, enabling the kiosk to discharge, test, and recharge each of the batteries in the tray individually. Each tray may also include an optional secondary contact or set of contacts 29 to apply signal or current to a specifically keyed recharging mechanism in each battery, further detailed in FIG. 8. One or more of the electrical contacts of each tray may be recessed into a surf of the tray, to provide physical protection of the battery contacts.

In an embodiment, batteries in a tray are protected by a barrier device, such as the hinged or flexible door or cover 31 ("tray door"). A tray door may further include one or more "windows" 30 enabling the kiosk to individually scan the enclosed batteries using a bar code reader or other reading means, such as to uniquely identify each battery. An exemplary battery tray may also house battery test strips configured (e.g., embedded, adhered, etc.) to enable consumers to conveniently check the state (e.g., level of a battery charge and/or discharge. Trays may also have slideable/movable flags or other user-operable features enabling consumers to indicate and to recognize which batteries are partially or entirely discharged and which are freshly charged, providing a convenient mechanism enabling consumers to more easily manage their batteries at home.

As mentioned, trays may be adorned with product branding and instructions, and may have a number of other design features, all of which are included within the scope of this patent. Operable features are included among the beneficial features in various embodiments. For example, batteries in an embodiment can include battery charge condition testing means configured to establish electrical contact with a battery coupled therewith, and to graphically, audibly or otherwise indicate to an approximate electrical charge condition of the battery. Test strips for such purposes in retail packaging for single-use batteries and/or affixed to the outside of single-use batteries are known to an ordinarily skilled artisan, and represent just one such available means for implementing a battery charge condition testing means herein.

Additionally, the battery trays themselves may include an affixed, integral, or otherwise associated information coding means such as a bar code, an RFID feature, etc. providing means for tracking each battery tray and providing tray-specific information to the control unit via a code-reading means suitably configured to detect and read the coding means. In addition to the listed features and benefits, the reusable trays reduce the waste generated by this system as compared to the packaging and other materials associated with disposable batteries.

Figure 6:
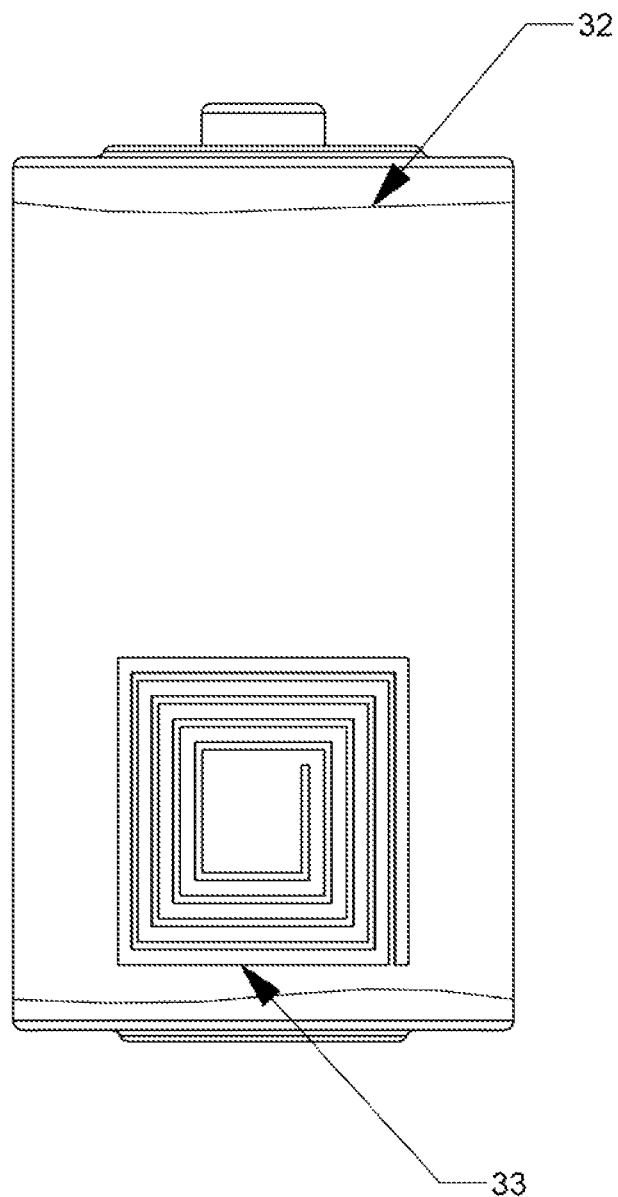
FIG. 6 depicts a frontal elevation view of common battery form factor with radio-frequency identification ("RFID") circuitry disposed thereupon, according to an embodiment of the invention.

FIG. 6 depicts an embodiment of a battery in one of several standard form factors. The battery includes an RFID tag 33, which may be either active or passive according to alternative embodiments, and will typically be disposed at the exterior of the battery casing. The RFID tag may be placed outside of the battery label, or between a sheath 32 and the battery casing, or otherwise coupled with the battery. A benefit to utilizing an RFID coding means is the ability to identify the battery at a distance, without the need for direct line-of-site scanning. In some embodiments, this simplifies the mechanical means provided in a kiosk to read batteries, such as by eliminating the need for "windows" 30 on the trays. However, RFID tags and readers are more expensive than bar codes, as are used in other embodiments of this invention.

Figure 7:
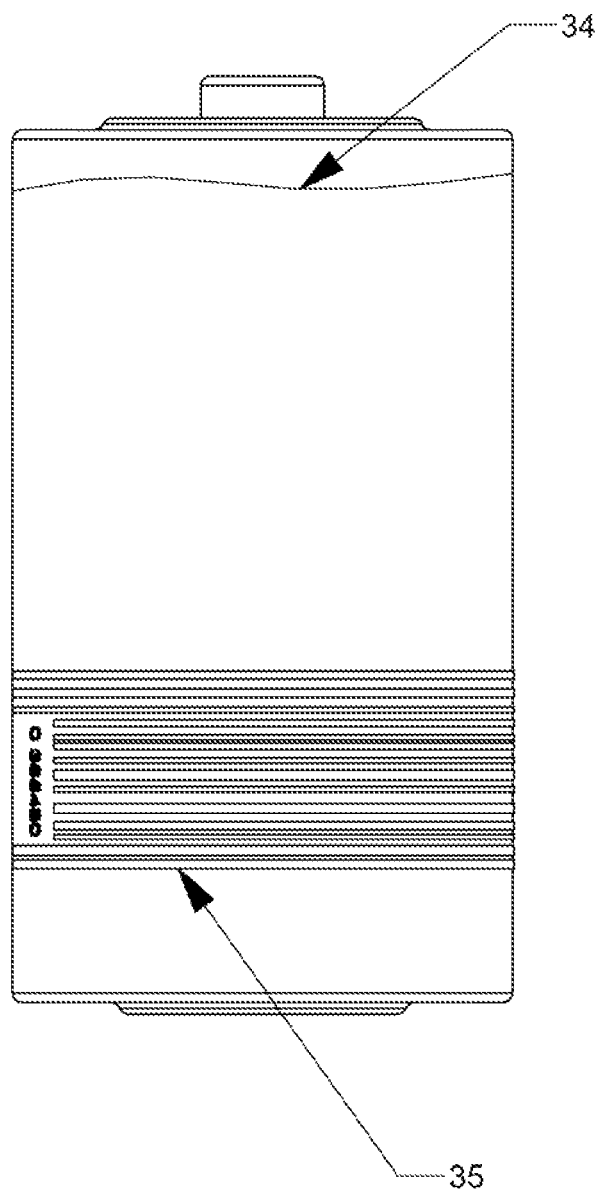
FIG. 7 depicts a frontal elevation view of common battery form factor with a machine-readable bar code pattern disposed circumferentially about an outer surface thereof, according to an embodiment of the invention.

FIG. 7 depicts another embodiment of a battery in one of several standard form factors, in this case with a bar code 35 disposed at the exterior of the battery. For example, the barcode can be affixed to, printed on, or embedded in a label 34 of the battery, although the embodiments are not so limited. In the depicted embodiment, which is exemplary but not exclusive, the bar code extends around the entire circumference of the battery. In this manner, the battery may be placed into the tray in any rotational orientation while still exposing the bar code to the "window" 30 of the tray, enabling reliable scanning by the kiosk. The bar code may be of any type (e.g., 1-D, 2-D, 3-D), and may contain information about battery chemistry, type, battery ID, and/or other information. Of course, in alternative embodiments, a bar code may only extend partially around a battery, or may comprise a narrow hand extending along a length of a battery at plural separate intervals distributed about a circumference of a battery.

Using RFID, bar codes, or other means to uniquely identify batteries enables sophisticated tracking of individual batteries, both for enabling the creation and tracking of usage models, as well as for creating business offers to consumers that provide incentives or discounts on a per-battery basis.

In an embodiment, batteries utilized with the invented kiosk apparatus, system and method may themselves be designed such that specially configured equipment is required to recharge them. For example, the primary positive terminal path in the battery may be protected by a field effect transistor ("FET") or diode 39, such that standard home-based battery rechargers are unable to apply recharge power in the normal manner via contact with the standard positive terminal 36. Instead, the secondary contact 37 may be used to apply a signal or current to the FET via a small lead 38, thereby allowing recharge current to be applied to the primary positive contact, passing through the FET to the interior of the battery.

Figure 8:
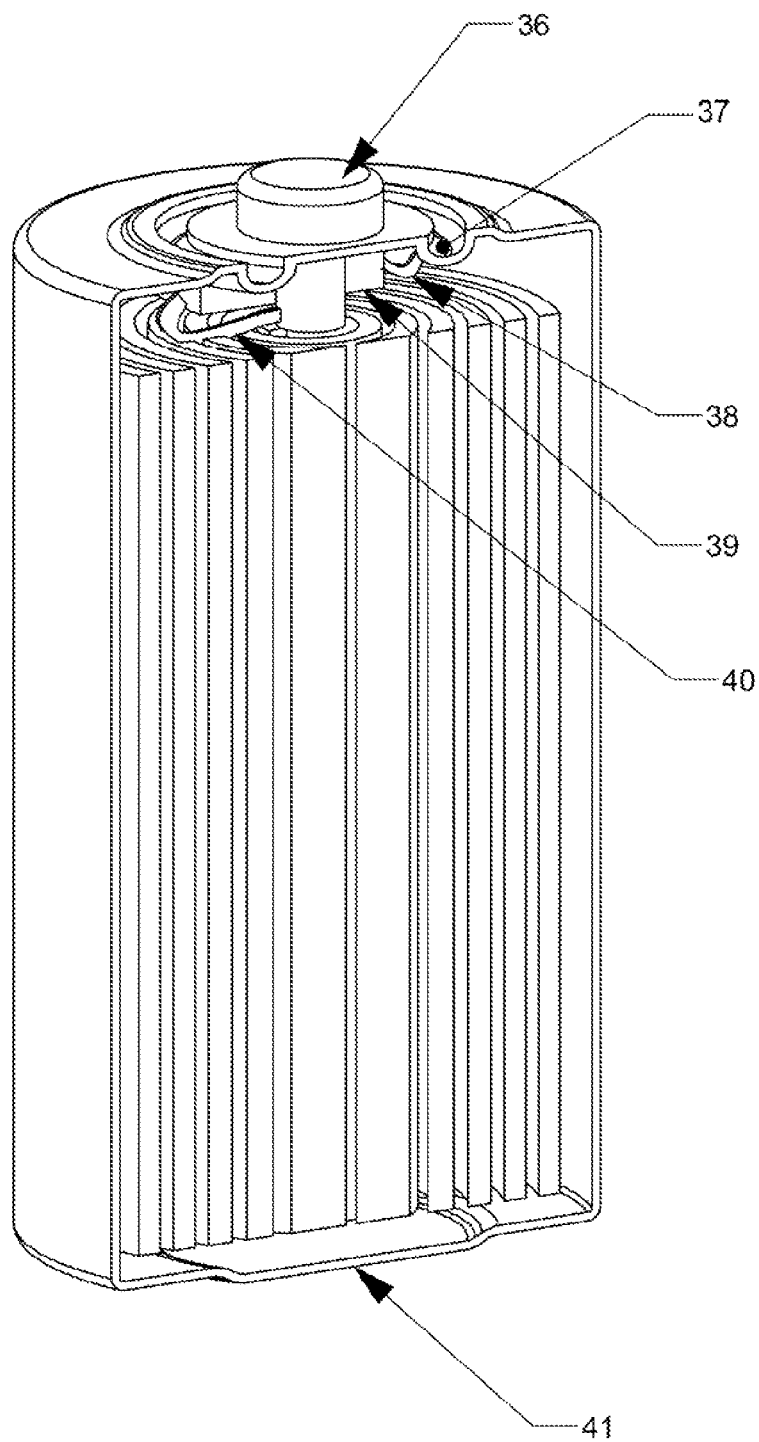
FIG. 8 depicts an isometric sectional view of a common battery form factor including embedded circuitry and/or a diode, and further including a third input contact for charging and/or signaling, according to an embodiment of the invention.

FIG. 8 shows one such embodiment of a standard form-factor battery that incorporates a dedicated recharge-input contact 37 disposed at the exterior of the battery. As shown, either or both of the location and the structural configuration of the recharge-input contact 37 can be "non-standard" relative to off-the-shelf consumer batteries. For example, the recharge-input contact in an embodiment comprises a circular (e.g., ring shaped) trough recessed throughout its circumference below a nominal surface plane at an end of a battery. As shown, the exemplary recharge-input contact also surrounds the otherwise normally configured positive terminal of the battery, which by contrast is raised above a nominal plane at the end of the battery.

In other embodiments, the recharge current may be applied directly to the secondary contact, which in turn provides recharge current to the primary contact via a small lead 40. While the secondary contact 37 shown in FIG. 8 is ring-shaped, it may also be a pin or another electrically conductive contact configuration located anywhere on the battery, providing an alternative and specially-keyed conductive path for recharging a battery. Whatever the structural configuration of the secondary contact, however, corresponding structure is typically provided within a battery tray to provide operative electrical contact with the secondary contact 37, for either or both of battery recharging and/or discharging operations.

The described embodiments encourage battery recharging only at kiosks, which in turn enables kiosk owners/operators to provide batteries at or near cost. This beneficial result helps to overcome consumer resistance to using rechargeable batteries on the basis that rechargeable batteries today are more expensive "up front." Additionally, by encouraging recharging only in embodiments of the described kiosks and being able to track recharging cycles for each battery throughout their respective lifecycles, the recharging conditions of batteries can be more carefully regulated, which contributes to extending the usable lifespan of rechargeable batteries. Therefore, the overall cost to both consumers and kiosk operators alike can be reduced, and battery waste entering the environment is greatly reduced.

Figure 9:
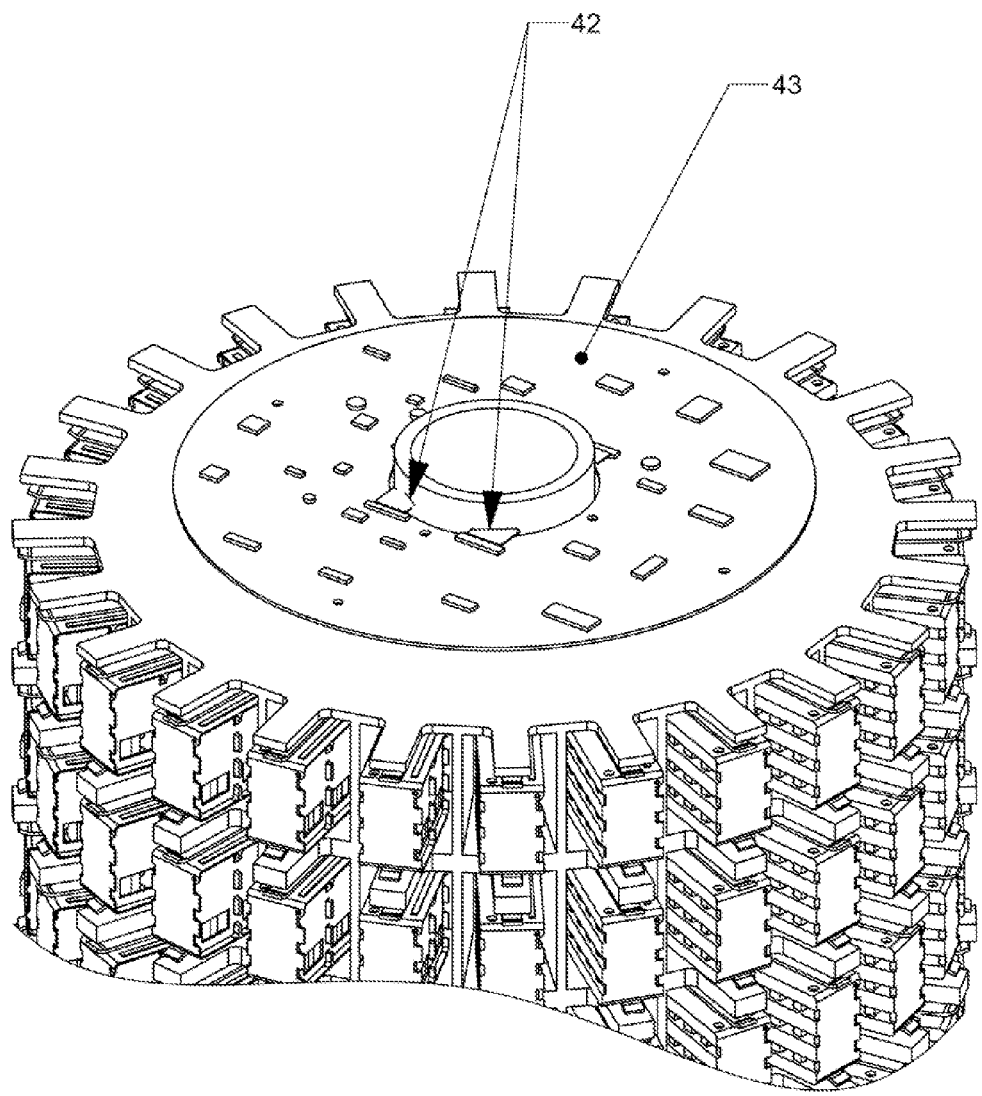
FIG. 9 depicts an isometric top view of a rotating storage/charging drum of a kiosk, with power control circuitry disposed at an upper end thereof, and including connections with each tray, according to an embodiment of the invention.

FIG. 9 depicts an upper end 43 of a rotating storage/charging drum (or "rack") in an embodiment of the invented kiosk apparatus and system. The drum includes power control circuitry and components configured as a portion of the battery testing/discharging and charging system that is capable of performing high-quality testing, discharging and recharging on multiple batteries simultaneously while the batteries are located in the rotating storage rack. Through electrical connections 42 between the charging system 43 and the individual trays, a plurality of batteries may be individually analyzed, discharged and recharged while in the storage rack, maintaining the entire inventory of batteries at or close to full charge (e.g., 100% of each battery's charge capacity).

One novel approach in this invention is the mourning of multiple, simultaneous systems on the storage rack, with individually addressable batteries in trays. For example, rather than only being able to receive, handle, and charge a specified battery type at a dedicated portion of a charging rack, embodiments of the invented kiosk apparatus and system can receive and charge at any charging receptacle of the charging rack any battery type that can be serviced by the kiosk. Such versatility derives largely although not exclusively from the standardized exterior configuration and dimensions of the battery trays, and from the ability of the system to identify a battery type contained within a tray, and/or to identify the charging needs and/or condition of each individual battery within a tray, when operably coupled at an individual charging receptacle of the charging rack.

Additionally, each charging receptacle/location of the charging rack, at which a battery tray can be coupled, is further endowed in art embodiment with a specific "address." Such addressing can include arbitrarily pre-assigning an identity (e.g., alphanumeric) to each charging receptacle, or can be based on relative positions within rows and/or columns of the charging rack, or by any other method that enables individual identification and/or tracking of an address for each charging receptacle.

A control unit of an exemplary kiosk maintains at a rewritable memory medium a machine-readable listing (e.g., a dynamic database) of the addresses of all charging receptacles of the charging rack. Via sensors coupled with electrical contacts of a charging receptacle or with electro-mechanical features (e.g., a microswitch, etc.) configured to be affected by placement or removal of a battery tray at a charging receptacle, or via an optical sensor configured to be likewise affected, a control unit of the kiosk will recognize and store in memory a record of which receptacle addresses are empty and which retain a battery tray, at any given point in time. In an embodiment, the control unit will store in memory information about one or more of the batteries retained in a tray disposed at each address throughout the charging rack.

In the event that a charging receptacle ceases to function properly, or otherwise becomes unusable or non-use is desired, either the control unit autonomously via special programming, or a system administrator via authorized access to an administrative function of the control unit, can designate a particular address/receptacle for non-use. Thereafter, the control unit will account for such designation in its operation until the address/receptacle is likewise designated for use. Alternatively, a 'dummy' or otherwise specifically configured battery tray (e.g., including a coding means with special 'non-use' instructions coded thereon) can be placed into a receptacle to temporarily withdraw the receptacle from normal use. Via a signal conveyed from a code-reading means, electromechanical sensor, optical sensor, or other feature of the receptacle, charging rack, or handling means, for example, the control unit may be informed that the address/receptacle is unavailable for use for battery charging, dispensing, or receiving used batteries/trays, until such dummy or otherwise specially configured battery tray is removed from the receptacle.

Alternatively, if the control unit senses that a charging receptacle is not functioning properly (e.g., due to excessive battery recharging times, failure to detect a battery tray or read a battery coupled with the receptacle, etc.), the control unit can signal the handling mechanism to recycle the battery tray out of and back into the receptacle one or more times. If the control unit detects that the problem persists or that others arise, the control unit can cause the handling mechanism to remove the battery tray and to couple it at a known properly-functioning receptacle, and withdraw the improperly-functioning receptacle from use by storing a 'non-use' record in memory corresponding to the address of such receptacle. Therefore, batteries in inventory are not removed from circulation by being inadvertently coupled at or by remaining at a defective charging receptacle.

Further, by continuous monitoring and/or periodic sampling, a control unit in an embodiment can also dynamically update a record indicating a real-time charge condition of each battery retained at each receptacle/address throughout the charging rack. By accessing and updating such stored records dynamically throughout normal operation, the control unit can guide a handling mechanism directly to an exact receptacle to retrieve a tray containing fully-charged batteries of a type requested by a user, and can likewise directly deliver a returned battery tray containing used batteries to an empty charging receptacle for recharging.

Further, by dynamically sensing and recording the relative positions of a battery tray handling mechanism and the charging rack via suitably disposed and configured sensors, and cross-referencing those positions with the address of ready-to-dispense batteries of a requested type, the system can retrieve and dispense a 'closest available' battery tray, and/or place returned battery trays at a closest available empty charging receptacle, minimizing the time, energy, and machine wear involved in such operations. The control unit, typically comprising a computing device, is generally configured with circuitry and logical programming suitable to perform as described herein. To this end, a drive system for the charging rack, controlled by the control unit, is also generally but not exclusively configured to enable bi-directional, on-demand rotation of the charging rack.

This design has numerous advantages beyond those described above, including: (a) maximizing the availability of inventory of recharged batteries while enabling the battery charging to be conducted at a rate that preserves the life of the batteries (as contrasted with quick charging, which reduces battery life), (b) reduces mechanical wear on the internal mechanisms by minimizing the number of times a battery is moved through the system, (c) does not limit the number or mix of battery types (for example, the entire rack could house AAA, AA, C, D, 9-volt or other relatively standard battery form factors, or any mix thereof), (d) enables the kiosk to accommodate new battery form factors, so long as the batteries can fit into a correspondingly configured but otherwise standard tray as described above, (e) enables the control system to individually manage batteries, down to the tray-level of specificity, and (f) maximizes the number of batteries that can be stored in a given volume, with a single rack and transport mechanism. Components of the charging system 43 may consist of a single, replaceable module, or may consist of individual modules that are easy to replace in case of a failure.

The recharge system 43 shown conducts various functions in embodiments, including detecting the charge level of batteries in the storage rack, and/or discharging/charging/reconditioning batteries as needed. It can also detect if a battery cannot be charged or is unable to maintain a charge, and can direct the control unit to discard the battery tray into a designated bin, or alternatively provide an indication in the database marking the battery for later retrieval by service technicians. The recharging system can also detect partially full trays (e.g., trays that are missing batteries), batteries which are inserted into trays upside down, or batteries of the wrong types that may have inadvertently slipped through the intake system. The recharging system may further routinely check batteries in inventory to ensure they are fully charged, and to "top off" the charge of batteries which may have self-discharged to some degree, or which may have been partially discharged as a normal part of system operation such as when the batteries in inventory serve as an uninterruptable power supply for the kiosk, as discussed. In alternative embodiments, the recharging system possesses its own computer control system separate from the kiosk's main control system or functions under direct control of the main control system, or some combination of the two situations.

Figure 10:
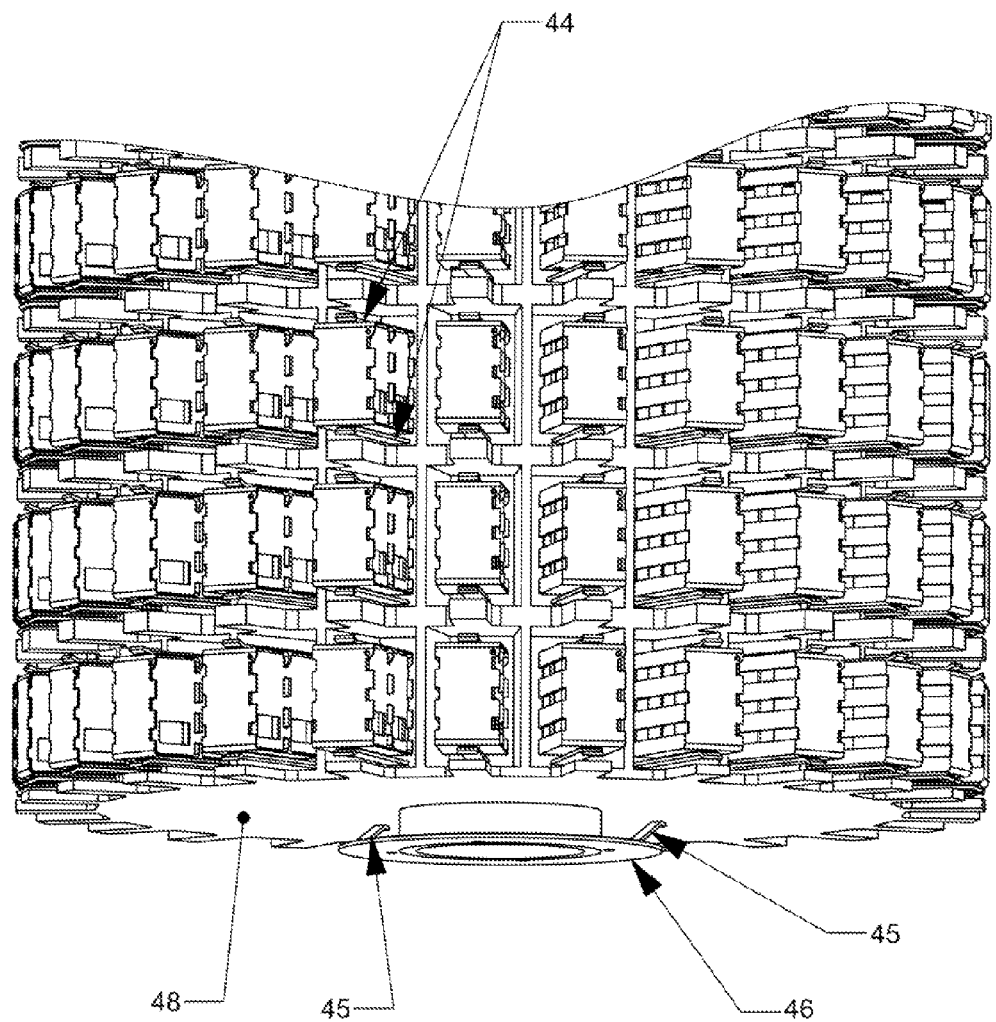
FIG. 10 depicts an isometric bottom view of the rotating storage/charging drum of FIG. 9, including battery contacts and a power contact, according to an embodiment of the invention.

FIG. 10 depicts a lower portion of an embodiment of the rotating storage rack 48. One embodiment of the rack is rotated under computer control to align specific vertical rows of batteries with the transport mechanism used to place and retrieve battery cartridges. Rotation of the rack may be driven by geared or belt driven mechanisms not depicted in this view. Also shown in FIG. 10 are individual battery tray holders and contacts 44 for each battery tray stored in the rack, power contacts (pickups) 45 providing power to the systems mounted on the rack, and a radial power contact 46 mounted to the kiosk enclosure and providing input power to the pickup contacts.

Figure 11:
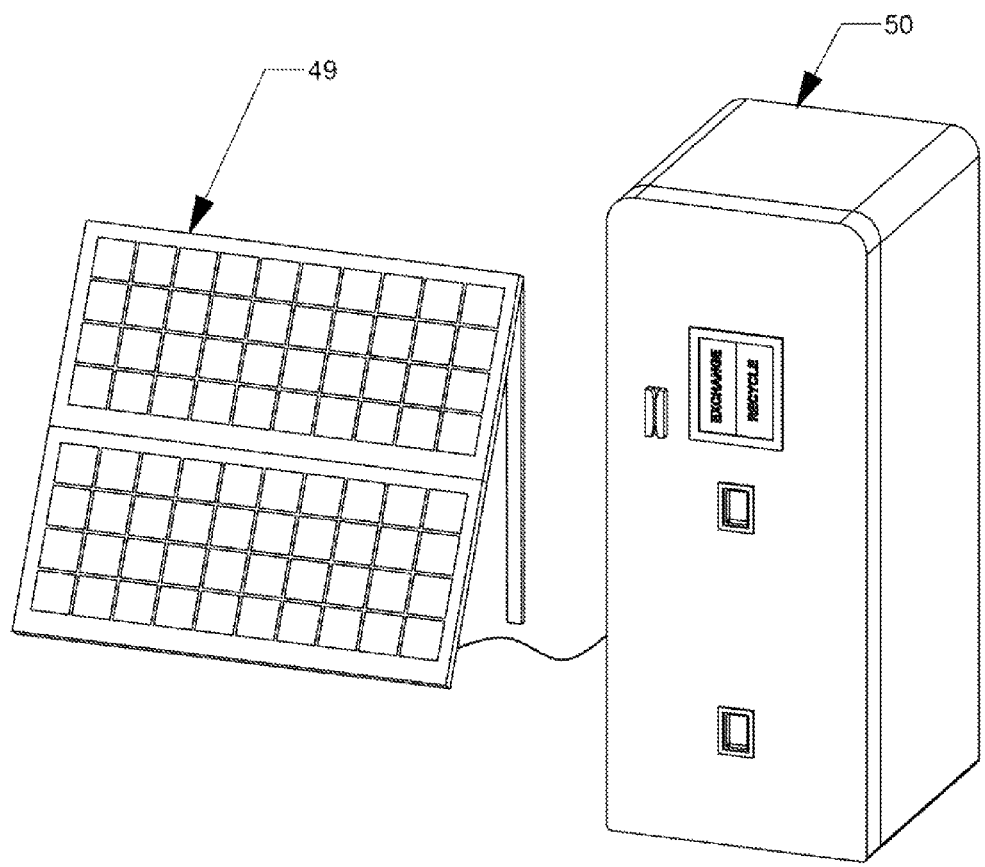
FIG. 11 depicts an isometric frontal view of a kiosk and an optional solar array for providing renewable energy to the kiosk, according to an embodiment of the invention.

FIG. 11 depicts an embodiment of the invented system including an optional solar array 49, co-located with the kiosk or mounted on a suitable structure such as a rooftop or other similarly sun-exposed location proximate to the kiosk, and being operably coupled with the kiosk via an electricity-conveying line (e.g., wire, cable, conduit, etc.). One contemplated embodiment further includes a power supply/control system that can handle multiple power-input sources, including solar power (PV arrays), standard AC power, or alternate AC sources (such as renewable power), and can use one or more of such sources to recharge batteries in inventory, to run the internal mechanisms of the kiosk, or both. As a recognizable environmental benefit, using solar power or another renewable power source (such as wind or geo-thermal power) to operate the invented kiosk apparatus and system significantly reduces the carbon dioxide ($CO_2$) generation associated with operation of the overall solution, by reducing or eliminating the need to rely on non-renewable power sources.

As described herein, the invented system uniquely provides for a high-capacity storage solution, capable of storing, recharging and managing enough batteries to serve busy retail locations with high-transaction volumes. Also uniquely, embodiments described herein include multiple, auto-sensing/switching power input sources that can provide for solar (with battery backup), renewable, or standard energy sources providing power to recharge the batteries and run the internal components of the system. Such auto-sensing can be achieved via suitably configured sensors operably coupled with a control unit of the kiosk to, for example, detect when voltage provided by a solar panel drops below a predetermined threshold stored in a machine-readable memory coupled with the kiosk, or when A/C power to the kiosk is interrupted during a power outage. For example, in an embodiment, the kiosk utilizes the then-current inventory of rechargeable household batteries as a back-up power source (uninterruptable power source, or UPS) in case of a power outage interrupting the supply of A/C power. In at least one such embodiment, the control unit selectively discharges batteries in inventory to provide the back-up power supply, rather than obtaining operating power from all batteries in inventory. In such manner, the kiosk maintains a portion of its battery inventory at 100% power for dispensing to consumers, while also providing sufficient power to keep the kiosk operable when local consumer demand for ready-to-use batteries can be reasonably expected to increase (e.g., during a power outage). For example, a control unit can selectively retain at full charge at least some batteries of each type (e.g., AA, 9-volt, etc.) in inventory.

Alternatively, the control unit can retain at full charge batteries of one or more designated 'high demand' types, while designating other battery types to provide the backup power. In any case, any particular selective discharging scheme to provide back-up power from batteries already in inventory can be either affected by local and real-time instructions input by a kiosk administrator (e.g., via the display panel, or a memory medium coupled with the control unit, etc.), or by instructions earlier stored in a machine-readable memory medium operably coupled with the kiosk control unit, or can alternatively be communicated to the kiosk control unit via a signal transmitted to the kiosk from a remote location. As would be understood by an ordinarily skilled artisan, one or more embodiments of the invented kiosk apparatus and system include communication means (e.g., a receiver or transceiver, etc.) suitably configured to receive a signal transmitted either by a conductive wire (e.g., electrically, optically, or otherwise conductive) or wirelessly, and to convey such instructions to the control unit and/or a machine-readable memory medium operably coupled therewith.

Alternatively, logic programmed into circuitry of the control unit (e.g., firmware) can sense a signal provided by a timing device (located within the kiosk or received from a remote source via a transmitted signal), and can switch from one power source or combination thereof to another power source or combination thereof based on such time-based signal, for example to take advantage of time-based lower-cost power.

Figure 12:
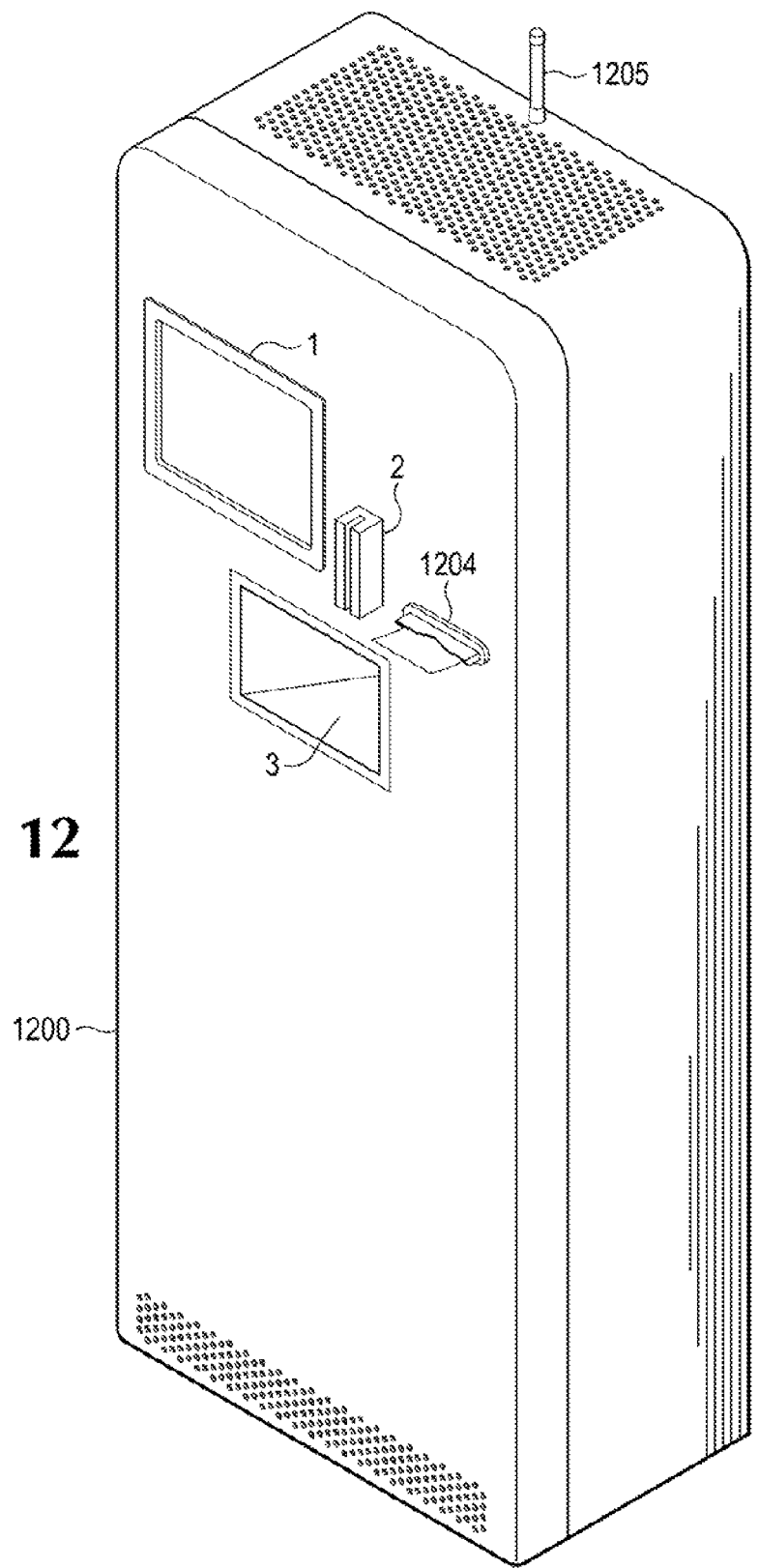
FIG. 12 depicts a front isometric view of a preferred embodiment of a battery recharging kiosk.

FIG. 12 depicts a front perspective view of a preferred embodiment of a battery recharging kiosk 1200. While being differently configured in respects from the kiosk device shown in FIGS. 1-2 and 9-11, both kiosk devices are considered to be aspects of the same invention described herein.

The kiosk 1200 optionally includes a primer 1204, in addition to the typical features of an intake port 3, a card reader 2 and a display 1. The printer, under control from control circuitry of the kiosk device, can output a receipt documenting a transaction, or information corresponding to a user-input inquiry (e.g., a record of transactions by that user), information corresponding to information displayed on the display 1, or other information. The printer mechanisms 1207 and a paper supply will generally be housed within the housing as seen in FIG. 13, with only printed paper exiting from an appropriately sized aperture formed through the housing.

Figure 13:
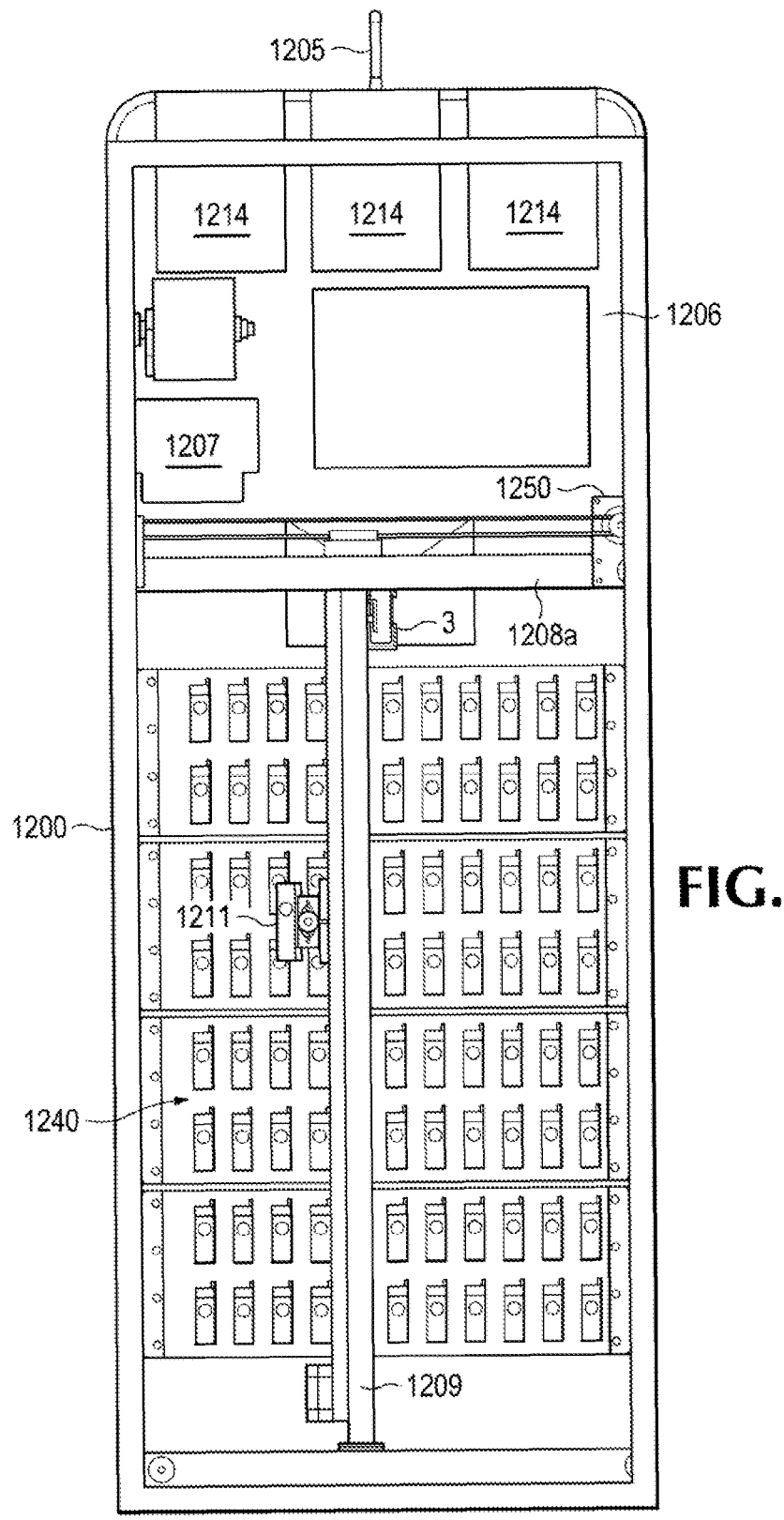
FIG. 13 depicts a rear elevation view of the battery recharging kiosk of FIG. 12.
Figure 14:
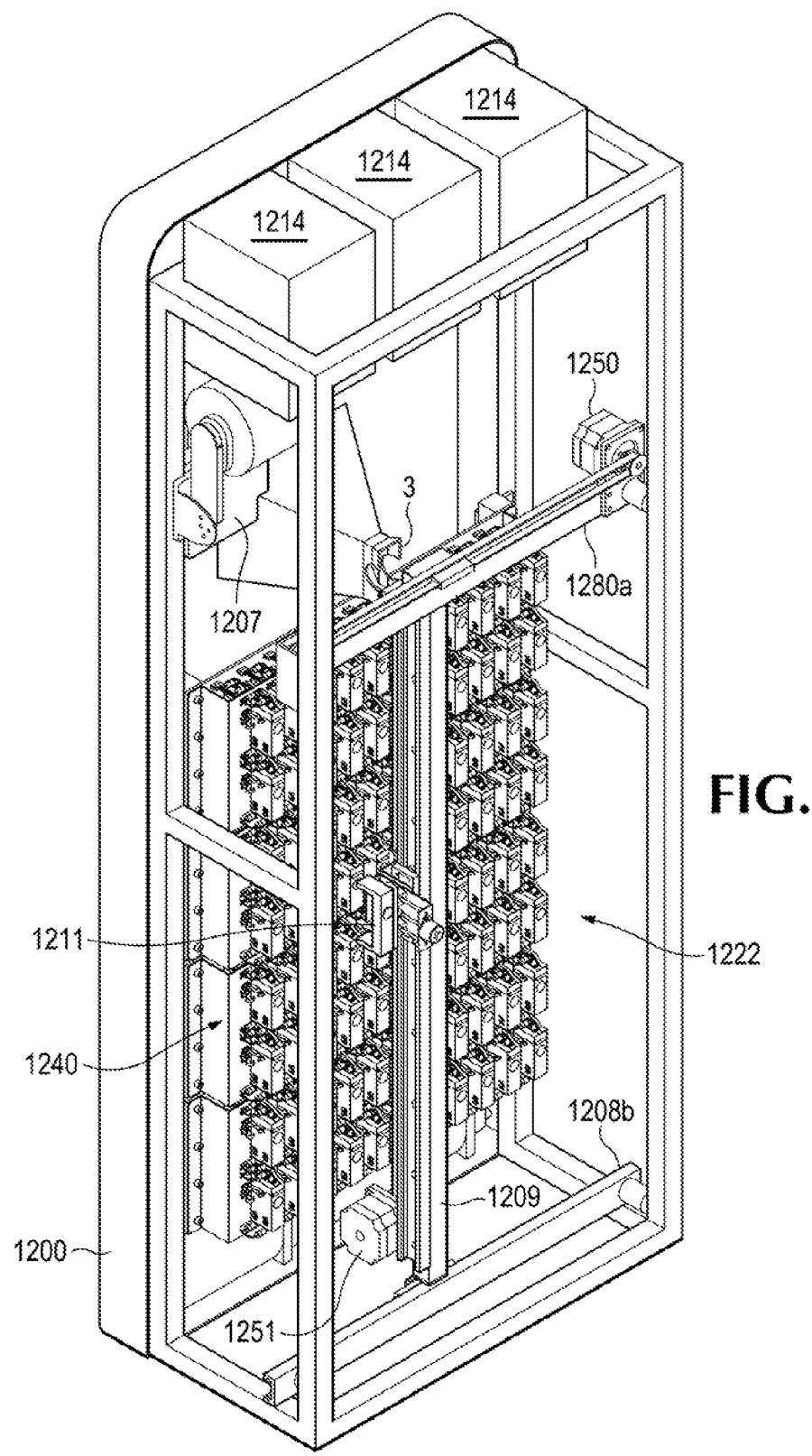
FIG. 14 depicts a rear isometric view of the battery recharging kiosk of FIG. 12 with portions of the housing rendered transparently to view an arrangement of the internal structures according to an embodiment of the invention.

FIGS. 13 and 14 depict rear elevation and perspective views of the battery recharging kiosk of FIG. 12, with panels of the housing rendered semi-transparently so that structures within the housing can be more clearly explained.

The kiosk 1200 is internally divided, with an electronics bay 1206 including one or more control units 1214 provided at an upper end, and also a recharging bay 1222, for example. The bays may simply correspond to separately located groupings of related operable components with one another, but in at least one embodiment a physical barrier or separator may be provided between the bays. The proximity of the control unit(s) and control circuitry to the display 1, the card reader 2, the printer, and other components that operate under influence of the control circuitry provides for an efficient layout with short runs of signal communication lines therebetween. Proximate to the electronics bay 1206, an air exhaust portal, vent, or other similar arrangement 1212 is typically provided through the kiosk housing, enabling heat generated by the control unit(s) to exit the kiosk housing.

The exemplary embodiment of FIGS. 12 and 13 includes a vertical gantry mechanism disposed within the recharging bay and configured to traverse a handling mechanism 1211 in plural perpendicular axes of movement collectively defining a vertically-oriented plane of movement. The gantry typically includes plural parallel gantry beams 1208a-b extending horizontally from proximate a first side of the kiosk device to proximate an opposing second side of the kiosk device. Generally, a first such horizontal gantry beam 12a will be located near an upper end of the recharging bay, while a corresponding second horizontal gantry beam 12b will be located near an opposing lower end of the recharging bay. Extending therebetween and coupled in perpendicular relation with each of the horizontal gantry beams is at least a first vertical gantry beam 1209. Alternatively and also within the scope of contemplated embodiments, a horizontal gantry beam can be movably coupled between two vertical gantry beams. Still further alternatives can feature a single horizontal gantry beam movably coupled with a single vertical gantry beam, or vice versa.

The coupling arrangement between the vertical gantry beam 1209 and each of the horizontal gantry beams 1208a-b is such that the vertical gantry beam is able to traverse freely bi-directionally along the length of each horizontal gantry beam when driven by one or more drive mechanisms 1250 operating under control of the control circuitry of the control unit. Suitable coupling arrangements operable by a drive mechanism include those commonly referred to as 'worm-screw' drive, chain drive, belt drive and others. Drive mechanisms can include any motor suitable for relatively precise control in response to signals provided from control circuitry, including e.g., stepper motors.

In addition to the vertical gantry beam 1209 traversing from side to side within the kiosk device, a handling mechanism 1211 is similarly coupled with the vertical gantry beam in a manner that enables the handling mechanism to traverse up and down along the length of the vertical gantry beam under control of a drive mechanism 1251, which is in turn controlled by the control circuitry of the control unit. The corresponding perpendicular axes of movement of the vertical beam and the handling mechanism collectively enable the handling mechanism to traverse a vertically-oriented plane of movement within the kiosk.

Separated by a substantially uniform distance from the handling mechanism's plane of movement is a recharging rack 1240 comprising one or more recharging boards 1210 arranged edgewise relative to one another and securely coupled with one or more structural members (e.g., bars, plates, etc.) within the kiosk. As an ordinarily skilled artisan will recognize, the juxtaposed recharging boards 1210 substantially define a plane that lies in a planar-parallel relationship relative to the handling mechanism's plane of movement.

Each recharging board, and therefore the recharging boards collectively, include an array of recharging receptacles configured to receive and retain battery cartridges during battery testing, recharging and storage. The configuration of each receptacle is described in greater detail below with regard to FIGS. 15-18. However, as can be seen in FIGS. 13 and 14, the receptacles within the array typically collectively are arranged within the outer limits of the handling mechanism's range of movement, such that the handling mechanism can place and remove a cartridge at any of the plural receptacles in the array during normal operation.

Figure 15:
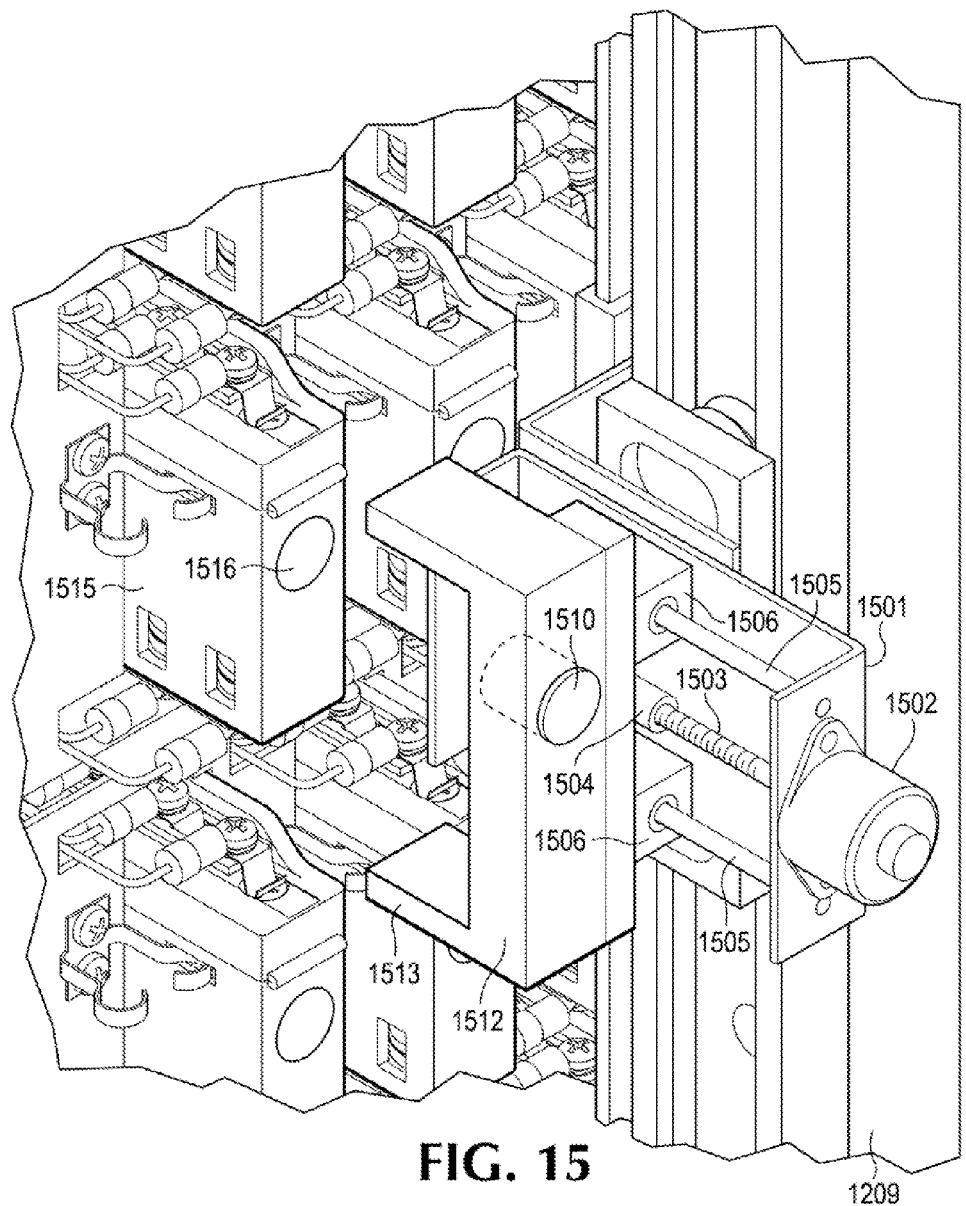
FIG. 15 depicts a close-up view of a handling mechanism coupled with a gantry mechanism as depicted in FIG. 14, including a handling mechanism and plural recharging, cartridges coupled with recharging boards, according to an embodiment of the invention.

FIG. 15 depicts a close-up view of a handling mechanism coupled with a gantry mechanism, and plural recharging cartridges coupled with recharging boards. As shown, a handling mechanism 1211 can comprise an operable assembly of multiple components in an exemplary embodiment, including a stage 1501 movably coupled with the vertical gantry beam 1209, a receiver 1512 movably coupled with the stage, and a drive mechanism 1502 coupled with each of the gantry (via the stage) and the handling mechanism. The second drive mechanism is configured, when actuated under control of control circuitry of the control unit(s), to translate a portion of the handling mechanism in a third axis of movement. Generally, the third axis comprises bi-directional movement forwardly and backwardly relative to the kiosk itself, but in general, the third axis of movement (referred to as the 'Z' axis or direction herein solely for descriptive convenience) lies perpendicular to the vertically-oriented X-Y plane of movement of the gantry. The second drive mechanism can be any of those discussed above relative to the drive mechanism(s) for the gantry beams, or any other suitable motor or other devices as would be recognized by an ordinarily skilled artisan.

The receiver portion of the handling mechanism can be configured, in embodiments, with support portions arranged to confront, engage or support exterior surfaces or features of a cartridge during use. For example, a support structure 1513 can extend outwardly from the receiver 1512 and be configured to underlie and support the bottom surface of a cartridge during handling. Alternative support structures can be provided similarly corresponding to a surface or structure at the top of a cartridge, as also shown in FIG. 15, or at one or both sides of a cartridge.

In a preferred embodiment, a handling mechanism includes an electromagnet 1510 coupled in communication with control circuitry and configured to actuate in response to control signals received from such circuitry. The electromagnet will typically be coupled with the receiver portion of the handling mechanism and otherwise configured so that a corresponding magnetically-attractive material 1516 disposed at a sidewall of a cartridge 1515 will enter into the magnetic field of the electromagnet during normal handling of the cartridge by the receiver portion. For example, as shown in FIG. 15, the electromagnet 1510 will align with the disk comprising a magnetically-attractive material 1516 when the receiver portion of the handling mechanism embraces the cartridge. Therefore, when the electromagnet is actuated by the control circuitry, the magnetic attraction between the electromagnet and the disk will securely yet temporarily couple the cartridge with the receiver portion of the handling mechanism. A suitably strong magnetic attraction will enable the handling mechanism to overcome the compressive forces of one or more spring clips retaining the cartridge at the charging receptacle, for example, enabling removal of the cartridge from the receptacle by the handling mechanism.

An ordinarily skilled artisan will recognize that the specific arrangement and configuration of the interacting electromagnetic features shown in FIG. 15 can be varied in alternative embodiments. For example, the handling mechanism could include plural electromagnets and the cartridge could include either plural correspondingly positioned magnetically-attractive structures or a single such structure configured to align with the plural electromagnets. Likewise, the electromagnets could be positioned at one or more of the support structures 1513 rather than or in addition to where shown in FIG. 15. Such variations will be apparent to an ordinarily skilled artisan in light of this explanation and the included figures.

As shown in the exemplary embodiment of FIG. 15, a drive mechanism 1502 coupled with the stage 1501 is likewise operably coupled with the receiver 1512 by, for example, a threaded (or toothed) shaft 1503. When actuated, the drive mechanism causes the shaft to rotate, and the threads of the shaft 1503 engage corresponding threads disposed at a portion 1504 of the receiver and cause the receiver to traverse along the long axis of the shaft in the 'Z' direction relative to the vertical gantry beam's plane of movement, and to engage or disengage a battery cartridge.

Guiding and stabilizing the receiver as it discloses along the shaft are one or more rods 1505 extending from the stage in parallel with the shall. One or more passages 1506 are formed into or through portions of the receiver, and are correspondingly dimensioned and positioned to receive coaxial, sliding passage of the rods therethrough, discouraging dislocation of the receiver in any direction other than parallel to the long axis of the shaft 1503. While an exemplary embodiment is described herein, the contemplated embodiments likewise encompass other drive mechanisms and associated structures configured and suitable to precisely extend and retract the receiver in the 'Z' direction, as would be apparent to an ordinarily skilled artisan in view of this description and the accompanying drawing figures.

The invention likewise contemplates sensors suitably arranged to detect a position of a gantry beam or the handling mechanisms, or any of the components thereof, and convey to the control unit a signal indicating the same. The control circuitry of the control unit, acting upon such signal and upon its stored programming instructions, can transmit a responsive signal to any of the drive mechanisms as needed to either initiate, terminate, or otherwise affect the movement and positions of the cartridge-handling parts of the kiosk device.

The above discussion describes the specific embodiment depicted in FIG. 15, and some of the contemplated alternatives thereof. Any ordinarily skilled artisan will likewise recognize other variations and alternatives that can be considered equivalents fully within the scope of the invention.

Figure 16A:
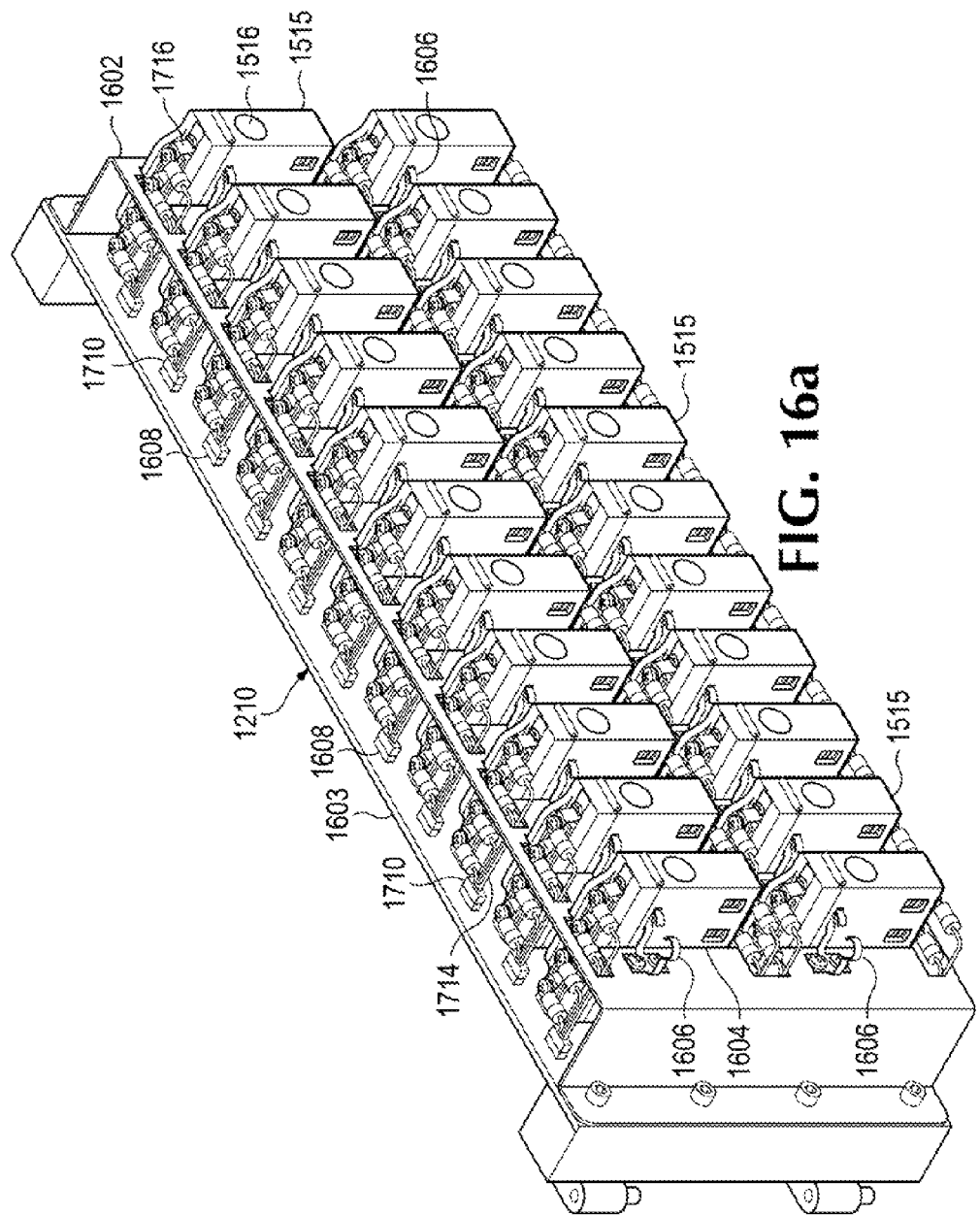
FIGS. 16a and 16b depict a recharging board and plural recharging receptacles, according to an embodiment of the invention.
Figure 16B:
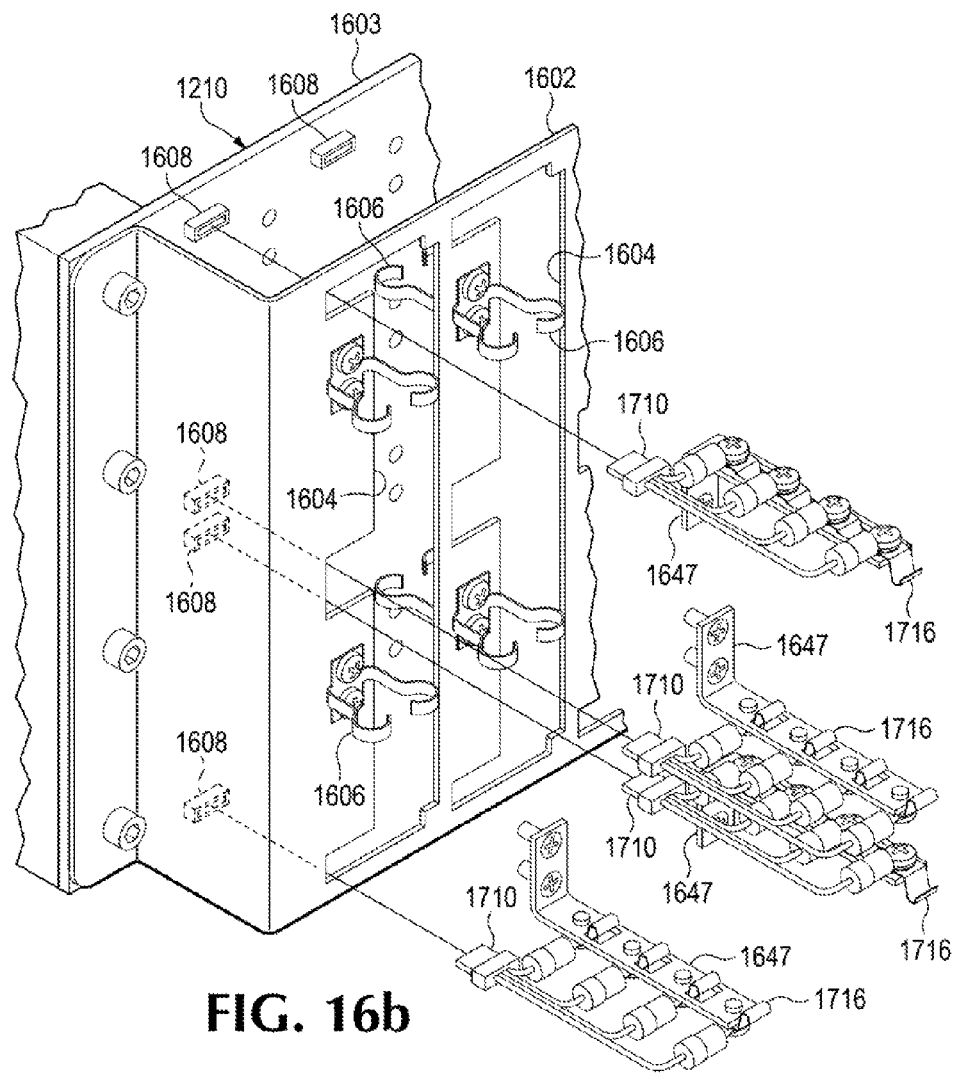
Figure 17:
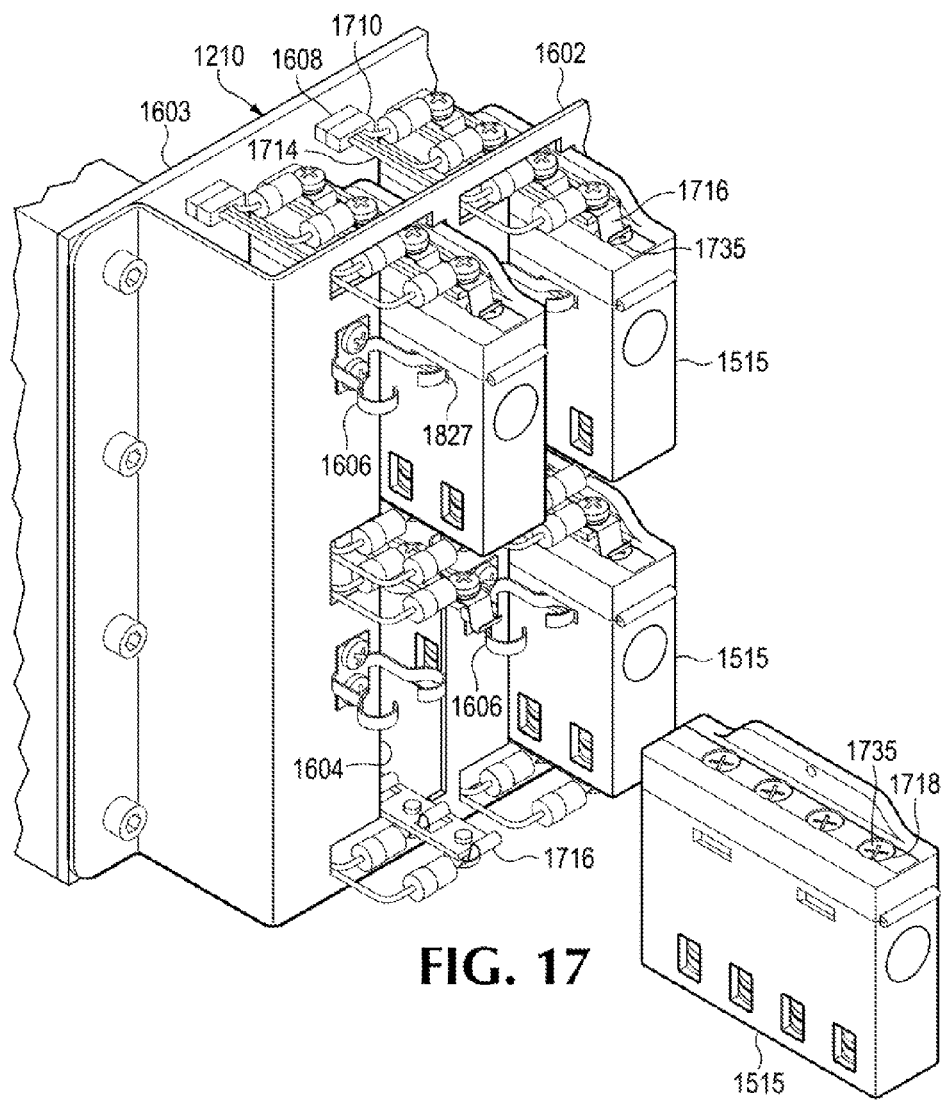
FIG. 17 depicts a battery cartridge coupled with a recharging receptacle, according to an embodiment of the invention.

FIGS. 16a-16b and FIG. 17 depict an embodiment of a recharging board 1210 including plural recharging receptacles 1604 for receiving, retaining, and recharging batteries in cartridges, and battery cartridges 1515 coupled at the recharging receptacles. A recharging board 1210 is generally configured as an expanse 1603 of a rigid or semi-rigid material or composition, and can comprise a single layer or multiple layers. In an exemplary embodiment, a recharging board is formed of a printed circuit board including integrated electrically-conductive leads (e.g., traces, wires, etc.).

A recharging board 1210 can also be entirely comprised of electrically non-conductive materials and can instead have electrical connectors (e.g., ports, plugs, buses, etc.) 1608 affixed thereto, with electrically-conductive leads (e.g., wires, etc.; not shown) leading to the connector from either or both of an electrical power source and control circuitry of a control unit 1214. Even in the case of a recharging board that comprises a printed circuit board, one or more of such connectors are generally provided to convey electrical signals from the board to the cartridges. For example, FIG. 16 depicts an array of connectors 1608 coupled with the recharging board 1210 and arranged corresponding to the receptacles 1604. For each receptacle, two corresponding connectors are provided; one for providing current flow to batteries in a cartridge, and the other for providing current flow from batteries in a cartridge coupled at the receptacle.

A corresponding plug 1710 is coupled with a connector 1608 on the recharging board 1210. The plug includes one or more conductive leads 1714 extending to one or more electrically-conductive probes 1716 arranged at each receptacle, and supported in position by a suitable support structure, for example the depicted L-brackets 1647 coupled with the recharging board 1210. Each probe is positioned and configured to establish electrically-conductive contact with, for example, a battery terminal 1736 exposed at a terminal access port 1718 of a cartridge when the cartridge is coupled at the receptacle. A similar, corresponding arrangement of connector, conductive leads, and probes is likewise provided for engagement with the opposing terminal of each battery presented outwardly at the opposing sidewall of the cartridge. By such arrangement of features, each battery in the cartridge is placed in electrical communication with either or both of a power source for recharging, and with control circuitry of the control unit for battery testing, battery type identification, or other functions.

Securely coupled with the recharging board in an embodiment is one or more retention brackets 1602, which can be configured according to a wide variety of forms. The exemplary embodiment in FIGS. 16*a*-16*b* includes a single retention bracket 1602 formed as a single unit of a stamped and bent sheet material, for example. Plural sequentially arranged openings are formed through the bracket 1602. In the depicted embodiment, each opening comprises two receptacles 1604, with each receptacle being configured to receive insertion of a battery cartridge as seen in FIG. 17. In general, the plural cartridge receptacles are configured to receive and retain cartridges having a uniform exterior size and configuration, and therefore the receptacles themselves generally also have a uniform configuration and dimensions corresponding to those of the cartridges. In an embodiment, a receptacle is configured to accommodate a unique keying structure, such as the fin shown asymmetrically disposed atop the cartridge in FIG. 17, allowing insertion of the cartridge at the receptacle in only a particular, predetermined orientation.

Retention mechanisms, such as retention clips 1606, are disposed adjacent to each receptacle and may be coupled with either or both of the retention bracket 1602 and the rigid expanse 1603 of the recharging board. As shown according to the embodiment of FIGS. 16*a*-16*b*, retention clips are aligned and coupled with both sides of the retention bracket in a back-to-back arrangement, providing a total of four spring-force-exerting contacts corresponding to each cartridge (see also FIG. 17). However, in other contemplated embodiments, the quantity, arrangement or types of retention mechanism can vary from the specific structures shown in FIGS. 16*a*-16*b*. Nearly any mechanical, electromechanical, magnetic or other structure or arrangement (e.g., rods, rails, clamps, etc.) that will receive and detachably retain a cartridge in position for recharging batteries disposed therein would be considered a suitable alternative retention mechanism and is within the scope of the contemplated embodiments.

Figure 18:
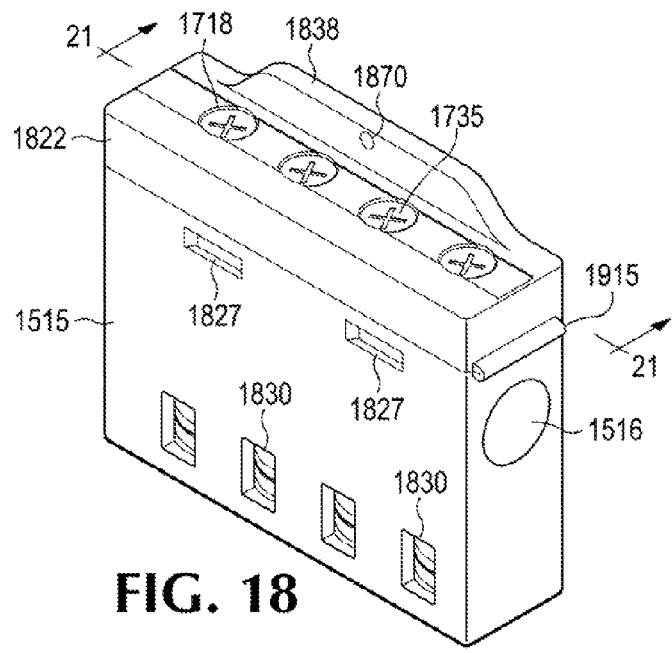
FIG. 18 depicts an isometric view of the exterior of a battery cartridge with a cover portion in a secured position, according to a preferred embodiment of the invention.
Figure 19:
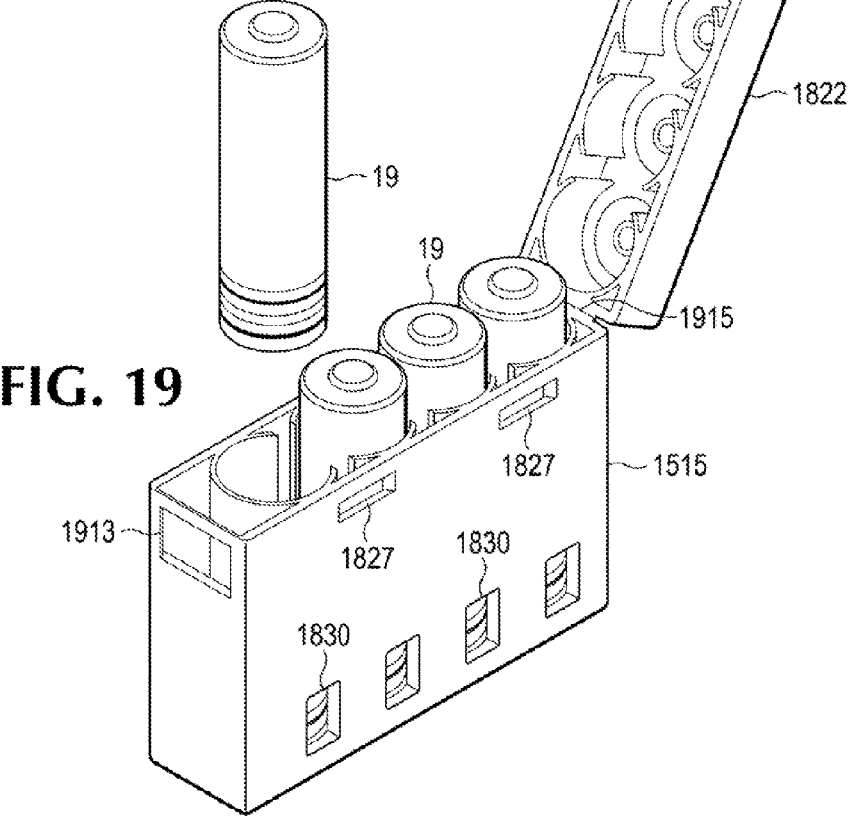
FIG. 19 depicts an isometric view of the exterior of a battery cartridge with a cover portion in an unsecured position, according to a preferred embodiment of the invention.
Figure 20:
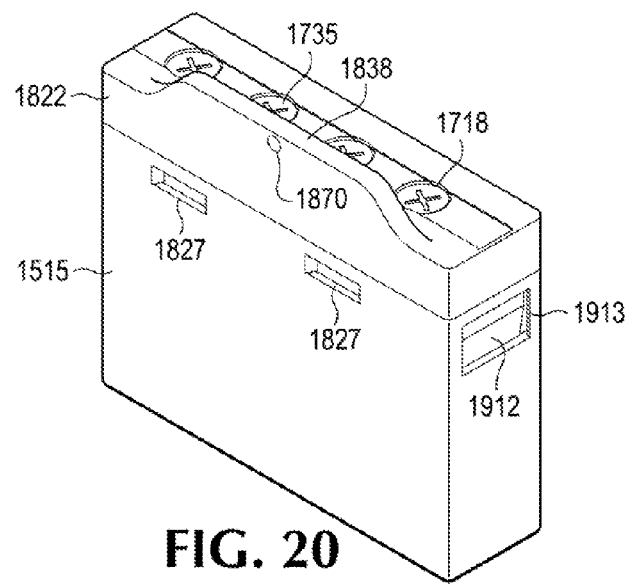
FIG. 20 depicts an isometric view of the exterior of a battery cartridge with battery viewing windows, according to a preferred embodiment of the invention.
Figure 21:
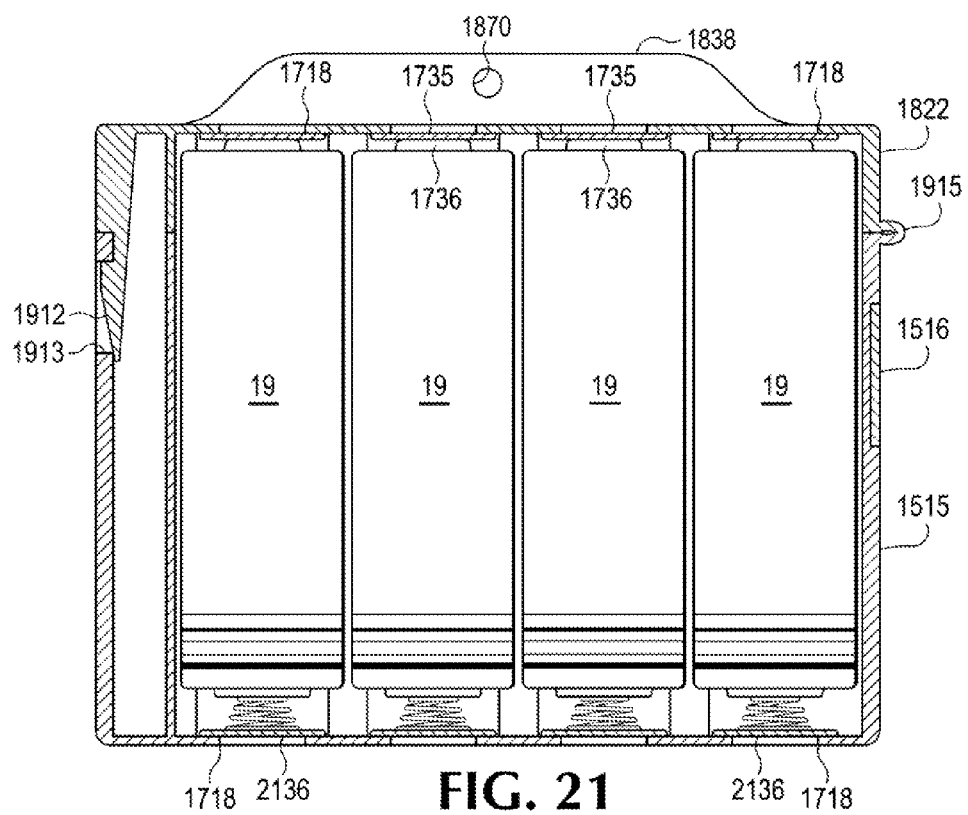
FIG. 21 depicts an isometric view of the exterior of a battery cartridge with the sidewalls rendered transparently, exposing to view an arrangement of batteries disposed therein, according to a preferred embodiment of the invention

FIGS. 18 and 20-21 depict perspective views of the exterior of a battery cartridge 1515, similar to that shown in FIG. 17, with a cover portion 1822 in a secured position, while FIG. 19 depicts a perspective view of a battery cartridge with the cover portion in an unsecured position. The battery cartridges 1515 of FIGS. 18-21 share many of the same features as those depicted in FIGS. 4*a*-4*f* and 5, including a securable cover 1822, one or more battery viewing windows 1830 formed through a sidewall of the cartridge to expose to external view a portion of a battery disposed therein, features indicating or otherwise limiting battery insertion to a particular predetermined battery orientation, position or arrangement, and others. However, FIGS. 18-21 also depict features such as the recesses 1827 formed into a sidewall at each side of the cartridge, arranged and configured to receive engagement with a receptacle's retention clips as shown in FIGS. 16*a*-17.

In general, the sidewalls and cover of an exemplary battery cartridge are formed primarily or entirely of an electrically non-conductive material. One or more battery terminal access ports 1831 are also provided through the cover 1822 in alignment with the terminals 1736 of batteries disposed therein. A terminal access port provides access for establishing physical contact, as well as electrical contact, with a battery terminal by an external probe, shown in FIG. 17. A terminal access port 1718 can be configured as an elongate slot or other opening through which plural battery terminals are exposed, or can comprise individual openings corresponding to each of the battery terminals, or nearly any other configuration that provides physical access for an external probe to establish electrically-conductive contact with a terminal of as battery when the cartridge cover is in a secured position.

While FIG. 18 depicts a terminal access port 1718 disposed at the cover portion 1822 of the cartridge, a similarly configured terminal access port is likewise provided, in an embodiment, at another portion of the cartridge corresponding to a second terminal of a battery. With terminal access ports provided as described herein, a cartridge need not itself include electrical contacts to engage with each of a battery terminal and an external probe. However, as best seen in FIG. 21, one or more contact members 1735, and spring-loaded contacts 2136 (collectively, 'contact members'), can be provided in the cartridge at one or more locations corresponding to one or more terminals of properly orientated batteries. Being disposed between each of the battery's terminal and an external probe, contact members 1735/2136 individually or collectively retain each battery in position, and also serve as electrically-conductive interfaces between an external probe and a battery terminal.

When a cartridge having one or more batteries disposed therein is engaged at a receptacle, and the external probes establish electrical contact with the corresponding terminals of each battery, the control circuitry can execute a test of each battery's charge condition; i.e., fully charged, partially charged, or fully discharged. Upon determining that a battery possesses a fully or partially discharged condition, the control circuitry generally causes a charging current to be applied to a terminal of the battery via the corresponding probes. Subsequently, upon determining that the battery has reached a charged condition, the control circuitry causes the charging current to cease being applied to the terminal of the battery.

Although FIGS. 17-21 depict the batteries 19 arranged in a single row within the cartridge, the batteries can be arranged differently in alternative embodiments, for example, in rows of two or more batteries (e.g., 2-by-2, 2-by-3, 3-by-3, etc.), and the internal and external structures and dimensions of the cartridge will correspond to such arrangement. In such alternative embodiments, features of the kiosk that interact with the cartridge and batteries, such as the probes, receptacles, retention clips, a receiving portion of the handling mechanism, the keyed intake port, and others, will be correspondingly arranged and configured according to the arrangement of the configuration and dimensions of the cartridges. Additionally, when a cartridge is configured to receive two rows of batteries, for example, multiple sides of the cartridge will generally include viewing windows, enabling a barcode or other identifying mark on each battery disposed in the cartridge to be viewed or otherwise accessed from outside the cartridge.

Further, as depicted in FIG. 18, a battery viewing window 1830 is offset from a center of the sidewall toward the 'bottom' of the cartridge in at least one embodiment. A predetermined portion of a battery at which a barcode is located, for example proximate the designated 'negative' terminal, is visible through the battery viewing window 1830 when the battery is disposed in the cartridge in a predetermined orientation. However, if a user inadvertently places the battery in the cartridge in an orientation other than the predetermined orientation, that portion of the battery will not be visible through the viewing window in the depicted embodiment. However, in at least one embodiment, the battery viewing window extends along a portion of the sidewall corresponding to most or all of the length of a battery disposed therein, exposing to view a barcode disposed anywhere along the length of the battery.

As shown in FIGS. 18 and 20-21, a keying structure 1838 is asymmetrically presented at an exterior of the cartridge, extending along one side of and offset from a center line of the cover 1822. A keying structure 1838 can project outwardly from the cartridge, as does the 'fin' or 'ridge' shown atop the cartridge in FIG. 18, or can alternatively be a groove or similar recess formed into a sidewall or the cover of the cartridge.

An asymmetrical keying structure 1838 generally physically corresponds to a reciprocal feature of an intake port, of a handling mechanism, or of a cartridge receptacle, etc., and indicates a unique orientation of the cartridge for proper interaction with such other structure. For example, only when the cartridge is properly orientated in all axes of rotation (e.g., upright, front-wise, etc.), will the keying structure align with a corresponding structure of an intake port of a kiosk device and permit insertion of the cartridge into the intake port. Improper orientation in any axis of rotation will result in mechanical interference between the keying structure and a feature of the intake port, preventing insertion of the cartridge. In the embodiment depicted in FIG. 18, a proper orientation for insertion requires that the cartridge be inserted with the keying structure orientated upwardly and on the user's right as they insert the leading end of the cartridge (that end having the magnetically-attractive member) into the intake port.

As shown in FIG. 18, a keying structure 1838 can also serve other useful purposes. For example, when a cartridge also serves as a retail package for the batteries, a hole 1870 can be provided through the keying structure and can be used for hanging the cartridge on a hook of a retail display. Alternatively, a barcode label can be provided on the keying structure for identifying or tracking the cartridge, or graphical designs or information such as branding, instructions, etc., can be printed on, molded into, or otherwise disposed on the keying structure.

FIG. 18 also depicts a magnetically-attractive member 1516 such as the circular disc disposed at a sidewall at an end of the cartridge 1515. The disc in the depicted embodiment is either integrated into the sidewall, or is coupled at an exterior surface thereof, and comprises a magnetically-attractive material (e.g., steel, iron, tin, etc.). As already described, this magnetically-attractive member corresponds positionally to the electromagnet of the handling-mechanism during loading and unloading of the cartridge from the kiosk, and therefore also occupies a relative standard position relative to the keying structure. The magnetically-attractive member should generally be securely coupled with the cartridge, as its coupling with the electromagnet likewise secures the cartridge to the handling mechanism and prevents inadvertent dropping of the cartridge during handling.

The magnetically-attractive member 1516 can take any of a broad range of shapes, and can comprise a localized feature as in FIG. 18, can be plural in number, or can comprise nearly the entire sidewall of the cartridge. In at least one embodiment, either a contiguous magnetically-attractive member, or plural magnetically-attractive members, are disposed along plural cartridge sidewalls, whether embedded therein or attached to an interior or exterior thereof.

As shown in FIGS. 18 and 19, the cover 1822 can be hinged along one side, enabling the cover to pivot along the hinge 1915 for opening and closing. The hinge can be a separate structure affixed to the cartridge sidewall and cover, or can have portions thereof embedded into the sidewall and cover. Alternatively, a hinge can be a 'live hinge' formed of a thinned material portion that is contiguous with each of the cover and the sidewall. Nearly any structure that enables the cover to pivot relative to the cartridge sidewall for opening and closing is considered a suitable hinge 1915 within the contemplated embodiments, although those hinge structures that are durable and can withstand repeated pivoting over an extended usage lifetime without failing are preferred.

Alternatively, in at least one embodiment, a cover can be entirely removed from the remainder of the cartridge body—e.g., in the manner of removing a lid from a shoe box—and can be replaced back onto the cartridge body. In such embodiments, a hinge would not ordinarily be necessary.

Typically, either or both of the cover and the cartridge body will include corresponding and interacting 'latching' features configured to secure the cover in a closed position, while also allowing a user to easily open the cartridge to access the batteries disposed therein or to place batteries into the cartridge. The latching features can be formed (e.g., molded, cut, etc.) into the cartridge or cover themselves, e.g. during the manufacturing thereof, or can be extrinsic components affixed thereto, or can be removable fasteners (e.g., screws, pins, clips, etc.), according to alternative embodiments.

FIG. 19 shows an exemplary embodiment in which the cover 1822 includes a latching structure 1912 configured to engage a corresponding latching feature 1913 provided at a sidewall of the cartridge. When the cover 1822 pivots upon the hinge 1915 toward a closed position, an angled 'ramp' portion of the latching structure 1912 on the cover, which is visible in FIG. 19, encounters a top edge of the cartridge sidewall. Further pivoting the cover 1822 along a downward trajectory causes the sidewall to deflect the latching structure 1912 inwardly from its ordinary position. When the cover reaches a fully closed position, a trailing edge of the ramp portion arrives within a recess or through-hole formed into the sidewalk the latching structure elastically resumes a non-deflected condition, and the trailing edge of the latching structure engages an inner edge of the recess, thus securing the cover in the closed position.

The latching structure of the cover can be released from the recess by manually or mechanically deflecting the latching structure inwardly relative to the recess and cartridge sidewall until the trailing edge of the latching structure dislocates beyond the inner edge of the recess. The cover can then be pivoted upwardly into an open and unsecured position, as shown in FIG. 19.

FIG. 19 depicts only one contemplated embodiment of means for securing a cartridge cover in a closed position. However, any structures or combination of structures that secure the cover in a closed position, but that can also be disengaged for once again opening the cartridge, are likewise considered suitable in an alternative embodiment and within the contemplated scope of the invention. This can include structures that are integrally formed with the cartridge or cover, as in FIG. 19, or can include separate fasteners such as pins, clips, threaded structures, elastic members, friction-fitting members, etc.

Although not described in detail, an ordinarily skilled artisan will also note internal cartridge structures depicted in at least FIG. 19, defining a 'cell' for each battery within the cartridge. Such retaining structures can take many forms according to alternative embodiments, but are provided and configured, in embodiments, to indicate a predetermined battery arrangement, and to retain batteries securely in position within the cartridge during use, storage, and transport. In the depicted embodiment, such sequentially arranged internal features are provided in both the cartridge body and in the cover portion, and will align with one another when the cover 1822 is pivoted into a closed and secured position.

The described battery trays also provide reliable, renewable, standardized means to receive, transport, store, test/ charge and dispense batteries within the kiosk, dramatically simplifying the design of the mechanisms configured to perform these operations, improving reliability and reducing manufacturing and service costs. Additionally, unlike prior art systems, the embodiments described include customized batteries in standard Consumer form-factors such as AAA, AA, C, D and 9-volt and correspondingly configured battery trays, and/or keying mechanisms to prevent battery charging by third parties thus preserving the integrity of the described system and the quality of the batteries served to customers therefrom.

It will be understood that the present invention is not limited to the method or detail of construction, fabrication, material, application or use described and illustrated herein. Indeed, any suitable variation of fabrication, use, or application is contemplated as an alternative embodiment, and thus is within the spirit and scope of the invention.

It is further intended that any other embodiments of the present invention that result from any changes in application or method of use or operation, configuration, method of manufacture, shape, size, or material, which are not specified within the detailed written description or illustrations contained herein yet would be understood by one skilled in the art, are within the scope of the present invention. For example, although the specification generally refers to electrical signals, an ordinarily skilled artisan should likewise understand that signal conduction via optical signaling means and the corresponding structures and devices (e.g., optical signal generators, optical fibers, etc.) also fall within the contemplated embodiments.

Finally, an ordinarily skilled artisan will appreciate that the invented method, system and apparatus described and illustrated herein may be implemented in software, firmware or hardware, or any suitable combination thereof. Preferably, the method system and apparatus are implemented in a combination of the three, for purposes of low cost and flexibility. Thus, an ordinarily skilled artisan will appreciate that embodiments of the method and system of the invention may be implemented by a computer or microprocessor process in which instructions are executed, the instructions being stored for execution on a computer-readable medium and being executed by any suitable instruction processor.

Accordingly, while the present invention has been shown and described with reference to the foregoing embodiments of the invented apparatus, it will be apparent to those skilled in the art that other changes in form and detail may be made therein without departing from the spirit and scope of the invention as defined in the appended claims.

We claim:

1. A battery cartridge and kiosk system, configured to receive and retain one or more standard sizes of rechargeable consumer batteries and to facilitate receipt, recharging, and dispensing of the batteries, the cartridge comprising:
   plural adjoining sidewalls defining an enclosure having an internal cavity configured to receive and retain one or more rechargeable consumer batteries in a predetermined arrangement and predetermined orientation;
   a cover portion that closes the cavity when disposed in a secured position, and that allows insertion and removal of batteries from the cavity when disposed in an unsecured position;
   a battery viewing window formed through a sidewall of the plural sidewalls and configured to expose to external view a portion of a battery disposed therein; and
   a keying structure asymmetrically presented at an exterior of the cartridge.

2. The system of claim 1, wherein the cartridge further comprises:
   a terminal access port provided through either or both of a sidewall and a cover of the cartridge and in alignment with a terminal of a battery disposed therein, the terminal access port providing access for establishing physical contact with the terminal by a probe that is external to the cartridge.

3. The system of claim 1, wherein the cartridge further comprises:
   one or more electrical contacts coupled with the enclosure and presenting a first electrically-conductive portion at an outer surface of the enclosure, the one or more electrical contacts further presenting a second electrically-conductive portion inwardly, the second electrically-conductive portion configured and arranged to establish electrically-conductive contact with a terminal of one or more batteries disposed within the cavity when the cover portion is in the secured position.

4. The system of claim 1, wherein the cartridge further comprises:
   either of a recess or a projection provided at an exterior surface of a sidewall of the cartridge and configured, when the cartridge is coupled with a recharging receptacle of the kiosk device, to detachably engage a corresponding retention mechanism coupled adjacent to the receptacle.

5. The system of claim 1, wherein one or more of the plural sidewalls of the cartridge comprise an electrically non-conductive material.

6. The system of claim 1, further including a corresponding kiosk device comprising:
   an exterior housing;
   an intake port provided through the housing, a portion of the intake port being differentially configured to allow passage of the keying structure of the cartridge when the cartridge is uniquely oriented for insertion therethrough;
   a vertical gantry mechanism disposed within the housing and configured with one or more first drive mechanisms configured to traverse a handling mechanism in perpendicular axes of movement collectively defining a vertically-oriented plane of movement;
   a handling mechanism coupled with the gantry and including an electromagnet, the electromagnet being coupled in communication with control circuitry and configured to actuate in response to control signals received therefrom; and
   at least a second drive mechanism coupled with either or both of the gantry and the handling mechanism, the second drive mechanism being configured to translate a portion of the handling mechanism in a third direction perpendicular to the vertically-oriented plane.

7. The system of claim 6, wherein either or both of the first and second drive mechanisms are coupled in electrical communication with control circuitry of the kiosk and are configured to actuate in response to control signals received from the control circuitry.

8. The system of claim 6, wherein the kiosk further comprises:
a cartridge storage and battery recharging rack arranged along and spaced apart from the vertically-oriented plane of movement of the gantry, the rack including an array of plural cartridge receptacles.

9. The system of claim 8, wherein the kiosk further comprises:
an electrically-conductive probe arranged at each receptacle of the array of receptacles, the probe being configured to contact a battery terminal and to establish electrically-conductive contact therewith when the cartridge is coupled at the receptacle.

10. The system of claim 1, wherein the cartridge further comprises:
a magnetically-attractive material disposed at a sidewall of the enclosure confronting the electromagnet when the handling mechanism engages the cartridge.

11. The system of claim 6, wherein the electromagnet, when confronting the magnetically-attractive material of the cartridge and actuated, is configured to magnetically couple with the magnetically-attractive material and to retain the cartridge coupled with the handling mechanism.

12. The system of claim 6, wherein the control circuitry is further configured, in response to a cartridge being coupled with a receptacle, to determine a charge condition of a battery disposed within the cartridge.

13. The system of claim 1, wherein the cover portion of the cartridge is pivotably coupled with a sidewall of the cartridge and includes a latching structure configured to detachably retain the cover portion in the secured position.

14. The system of claim 1, wherein the battery viewing window is offset from a center of the sidewall, and wherein a predetermined portion of a battery is visible through the battery viewing window when the battery is disposed in the predetermined orientation but is not visible when the battery is disposed in other than the predetermined orientation.

15. The system of claim 8, wherein the plural cartridge receptacles are configured to receive and retain cartridges having a uniform exterior size and configuration.

16. The system of claim 8, further comprising:
a sensor associated with one of the plural receptacles and configured to be affected by either or both of a presence or an absence of a cartridge coupled with the receptacle, and further to responsively convey an electrical signal to the control circuitry.

17. The system of claim 16, further comprising:
a machine-readable memory medium coupled with the control circuitry and configured with a stored record of unique addresses for each of the plural receptacles.

18. The system of claim 17, further comprising:
a control unit configured to receive a signal from the sensor and to update the stored record with information indicating that a cartridge is coupled with the receptacle.

19. The system of claim 12, wherein:
upon determining that a battery possesses a discharged condition, the control circuitry causes a charging current to be applied to a terminal of the battery via an electrically-conductive probe associated with the receptacle and disposed in electrically-conductive contact with the terminal, and
upon determining that the battery has reached a charged condition, the control circuitry causes the charging current to cease being applied to the terminal of the battery.

20. The system of claim 19, wherein the control circuitry is configured to dynamically update a machine-readable memory medium coupled therewith and configured with a record of unique addresses for each of the plural receptacles with information indicating a real-time charge condition of each battery retained at each receptacle/address throughout the charging rack.

21. The system of claim 6, further comprising:
sensors suitably disposed and configured to dynamically sense a position of the handling mechanism relative to the recharging rack.

22. The system of claim 21, wherein the control circuitry is configured to:
cross-reference the position of the handling mechanism with an address of a closest available receptacle having coupled thereat one or more batteries determined to be in a charged condition; and
cause the handling mechanism to retrieve a cartridge at that receptacle for dispensing to a user.

23. The system of claim 21, wherein the control circuitry is configured to:
cross-reference the position of the handling mechanism with an address of a closest available receptacle having no cartridge coupled thereat; and
cause the handling mechanism to deliver to that receptacle as cartridge containing a battery suspected to be in a discharged condition.

24. The system of claim 8, wherein the recharging rack comprises plural recharging boards each coupled in electrical communication with the control circuitry.

25. The system of claim 6, wherein the intake port includes a reading means coupled therewith to read identity information associated with either or both of a cartridge or a battery disposed therein, wherein the reading means comprises one or more of a bar code reading device, a radio frequency identification (RFID) reading device, and a text reading device.

26. The system of claim 6, wherein the vertical gantry mechanism comprises:
plural parallel horizontal gantry beams extending horizontally from proximate a first side of the kiosk device to proximate an opposing second side of the kiosk device; and
at least a first vertical gantry beam extending between and moveably coupled in perpendicular relation with each of the plural horizontal gantry beams to traverse bi-directionally therealong when driven by one or more of the first drive mechanisms.

27. The system of claim 6, wherein the kiosk device is operably coupled with a solar array.

28. The system of claim 27, wherein control circuitry of the kiosk device is configured to cause an electrical current received from the solar array to be stored at a storage battery of the kiosk.

29. The system of claim 28, wherein control circuitry of the kiosk device is configured to utilize an electrical current received from either or both of the solar array and the storage battery when an electrical current from a primary continuous power source is interrupted.

30. The system of claim 27, wherein control circuitry of the kiosk device is configured to operate using an electrical current received from one or more batteries coupled at one or more receptacles when an electrical current from a primary continuous power source is interrupted.

* * * * *